(12) United States Patent
Schuster

(10) Patent No.: US 12,338,609 B2
(45) Date of Patent: Jun. 24, 2025

(54) METHOD OF MODIFYING A FLUID SUPPLY FEATURE

(71) Applicant: M3WE, Inc., Shorewood, IL (US)

(72) Inventor: Michael J. Schuster, Shorewood, IL (US)

(73) Assignee: M3WE, Inc., Shorewood, IL (US)

( * ) Notice: Subject to any disclaimer, the term of this patent is extended or adjusted under 35 U.S.C. 154(b) by 498 days.

(21) Appl. No.: 17/580,024

(22) Filed: Jan. 20, 2022

(65) Prior Publication Data
US 2023/0228071 A1 Jul. 20, 2023

(51) Int. Cl.
*E03C 1/042* (2006.01)
*E03C 1/02* (2006.01)
*E03C 1/04* (2006.01)
*F16K 27/12* (2006.01)

(52) U.S. Cl.
CPC .............. *E03C 1/042* (2013.01); *E03C 1/021* (2013.01); *E03C 1/0403* (2013.01); *F16K 27/12* (2013.01); *E03C 2001/026* (2013.01)

(58) Field of Classification Search
CPC ...... E03C 1/042; E03C 1/021; E03C 2201/50; F16K 27/12; F16L 59/11; F16L 59/025; F16L 59/161; F16L 59/168; Y10T 137/7062
See application file for complete search history.

(56) References Cited

U.S. PATENT DOCUMENTS

| | | | | |
|---|---|---|---|---|
| 1,499,562 A | * | 7/1924 | Tampier | F16K 27/12 251/225 |
| 1,502,154 A | * | 7/1924 | Mueller | F16L 5/12 285/46 |
| 3,425,456 A | * | 2/1969 | Schibig | F16L 59/11 174/136 |
| 5,054,513 A | * | 10/1991 | Trueb | E03C 1/041 138/158 |
| 5,360,031 A | * | 11/1994 | Trueb | F16L 59/168 137/375 |
| 5,363,517 A | * | 11/1994 | Botsolas | E03C 1/122 4/661 |
| 5,588,681 A | * | 12/1996 | Parks | F16L 5/00 285/46 |
| 5,685,328 A | * | 11/1997 | Helmsderfer | F16L 59/168 137/15.01 |
| 5,797,415 A | * | 8/1998 | Nicholson | F16L 59/161 137/15.01 |
| 5,901,739 A | * | 5/1999 | Helmsderfer | E03C 1/12 138/155 |
| 6,000,420 A | * | 12/1999 | Nicholson | F16L 59/16 137/15.01 |

(Continued)

Primary Examiner — Reinaldo Sanchez-Medina
(74) Attorney, Agent, or Firm — Wood, Phillips, Katz, Clark & Mortimer

(57) ABSTRACT

A method of modifying a fluid supply feature having a conduit communicating fluid from a source to a valve through which fluid is delivered to a point of use. The method includes the steps of: obtaining a kit made up of a plurality of components; and interconnecting the plurality of components with each other and at least one of the conduit and valve to thereby maintain the plurality of components in an operative relationship wherein the plurality of components overlie an exposed surface on at least one of the valve and conduit.

30 Claims, 30 Drawing Sheets

(56) References Cited

U.S. PATENT DOCUMENTS

| | | | | |
|---|---|---|---|---|
| 6,012,480 A * | 1/2000 | Helmsderfer | F16L 9/22 | |
| | | | 138/146 | |
| 6,161,568 A * | 12/2000 | Dragotta | F16L 5/00 | |
| | | | 137/359 | |
| 6,389,756 B1 * | 5/2002 | Oberdorfer | E03C 1/042 | |
| | | | 285/46 | |
| 6,568,421 B2 * | 5/2003 | Anderson | E03C 1/102 | |
| | | | 138/158 | |
| 6,739,353 B2 * | 5/2004 | Lechuga | F16L 59/22 | |
| | | | 138/158 | |
| 7,762,275 B1 * | 7/2010 | Ventura | F16K 31/50 | |
| | | | 137/382 | |
| 8,459,287 B1 * | 6/2013 | Preudhomme | F16L 19/065 | |
| | | | 29/890.144 | |
| 2006/0070662 A1 * | 4/2006 | Gremillion, III | F16K 27/12 | |
| | | | 137/382 | |
| 2017/0016557 A1 * | 1/2017 | Hoffman | F16L 59/028 | |

* cited by examiner

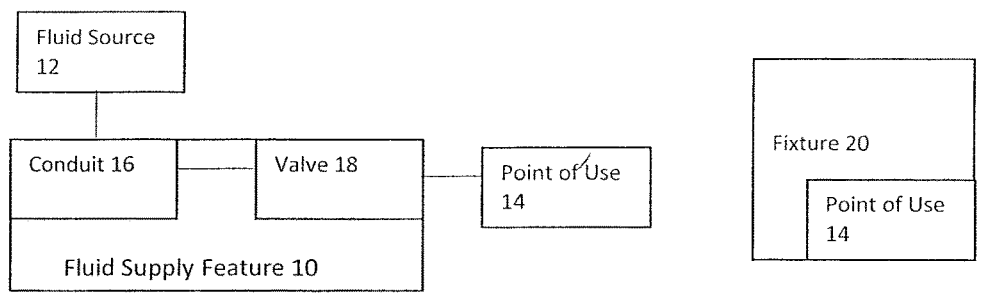
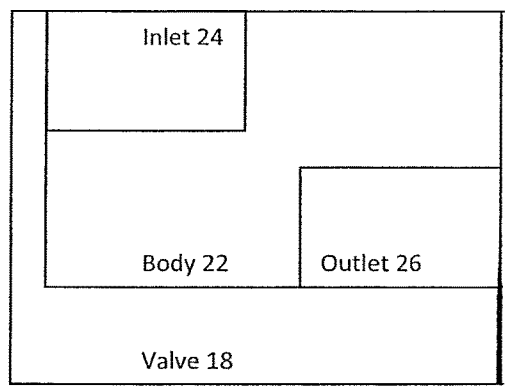
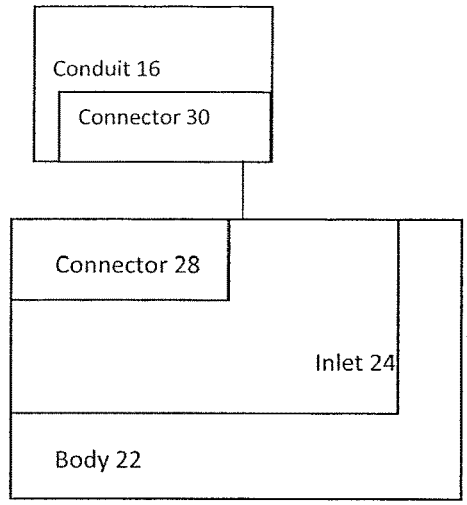
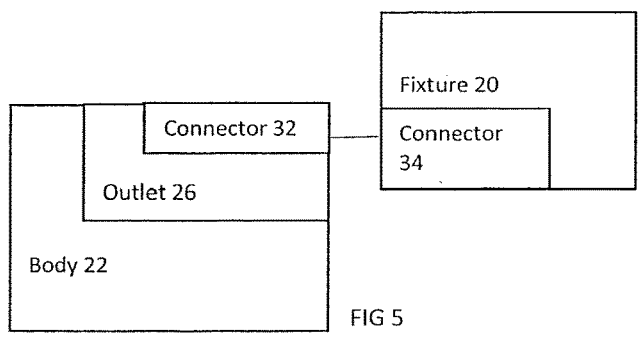
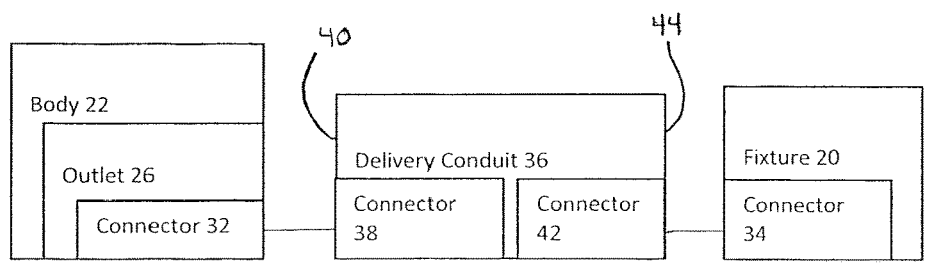

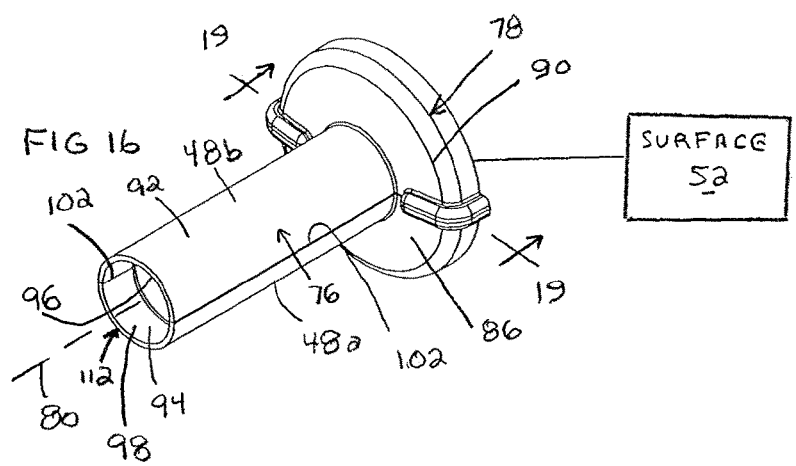
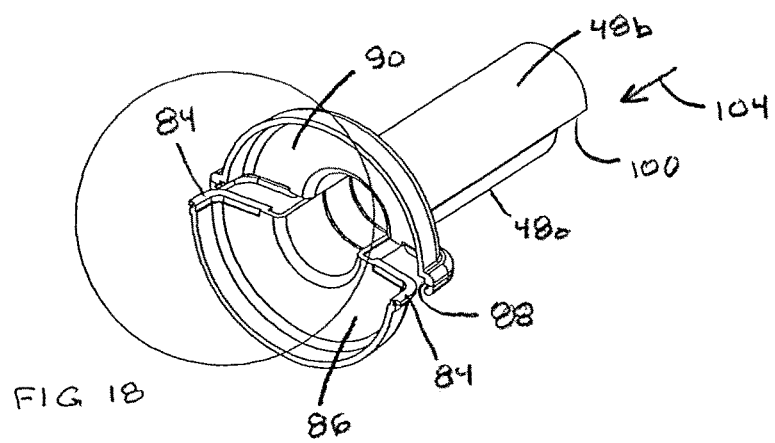
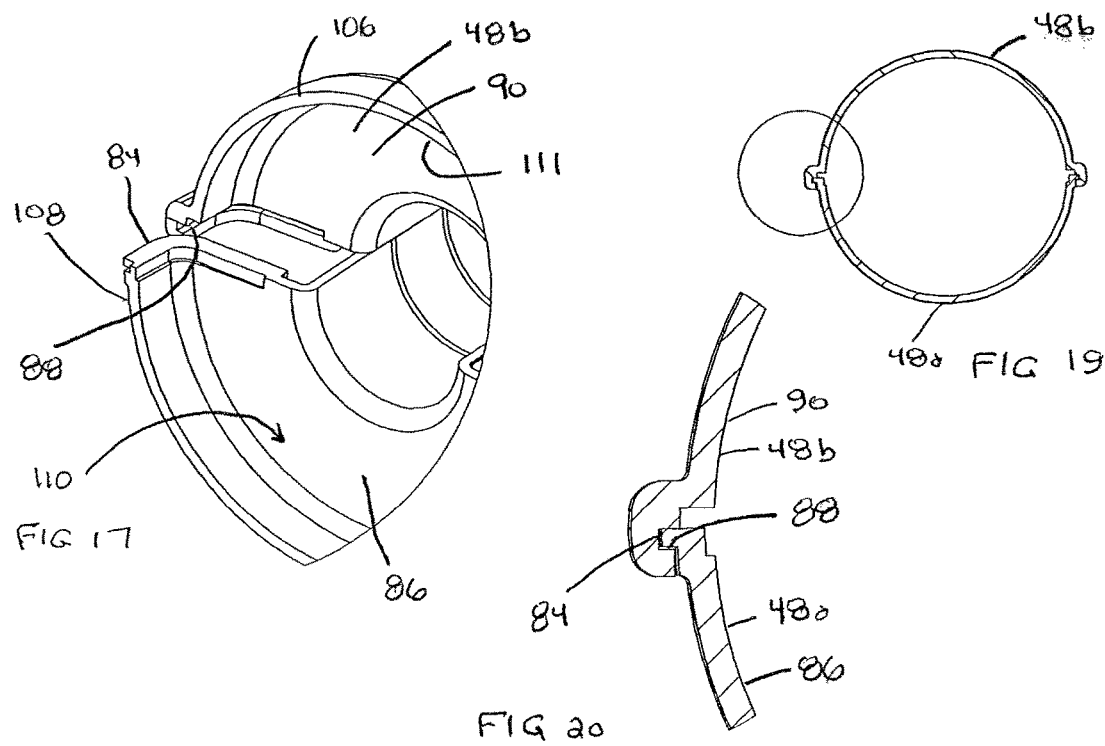

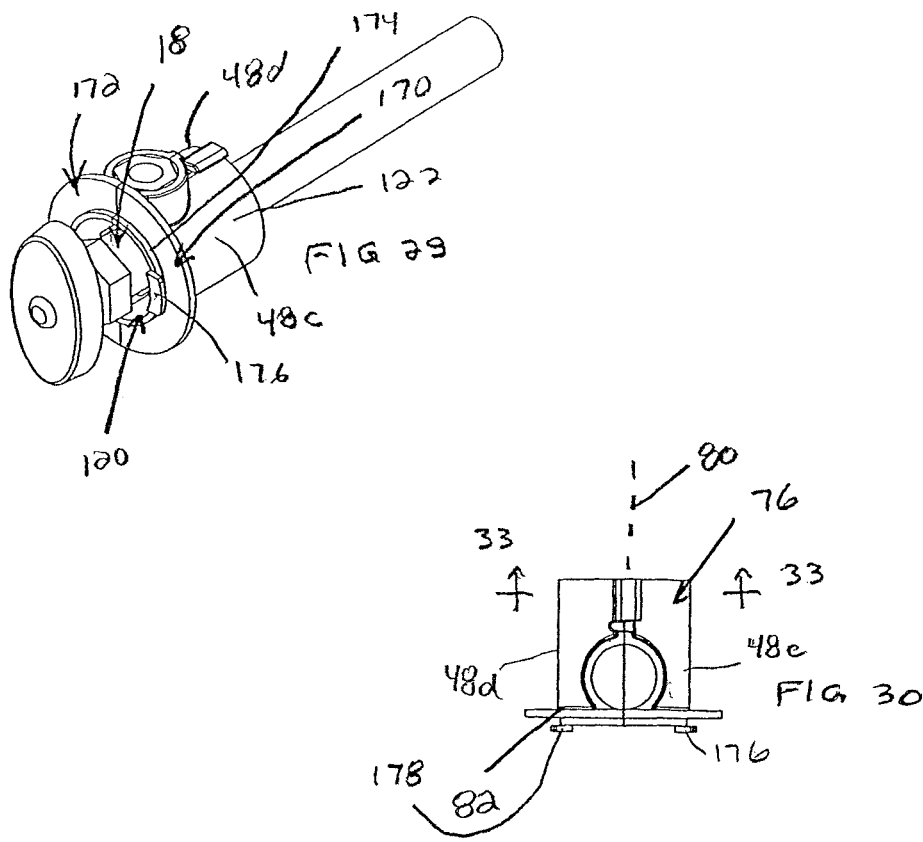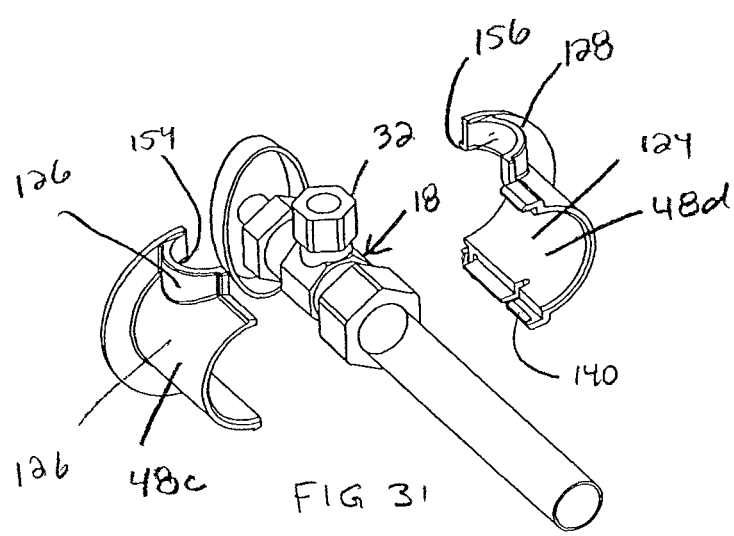

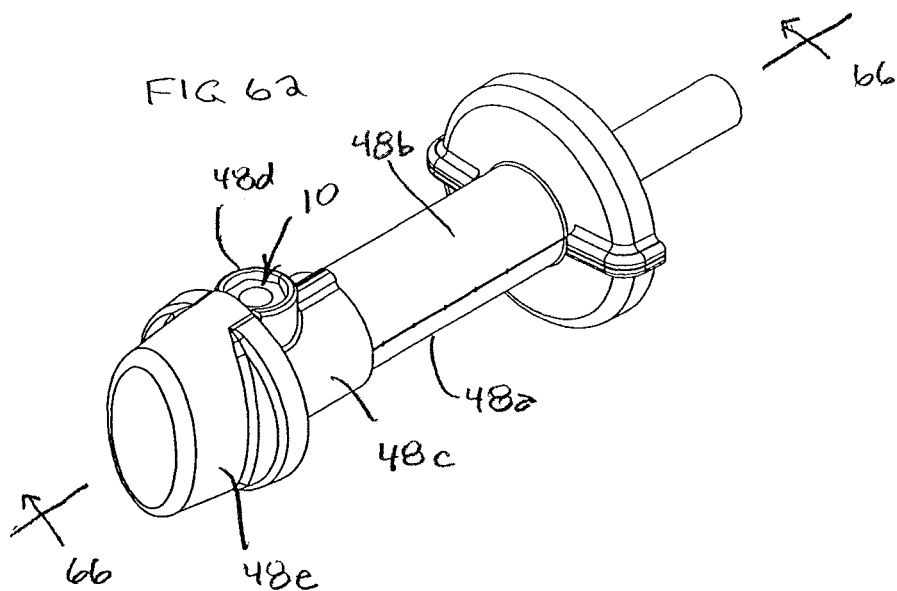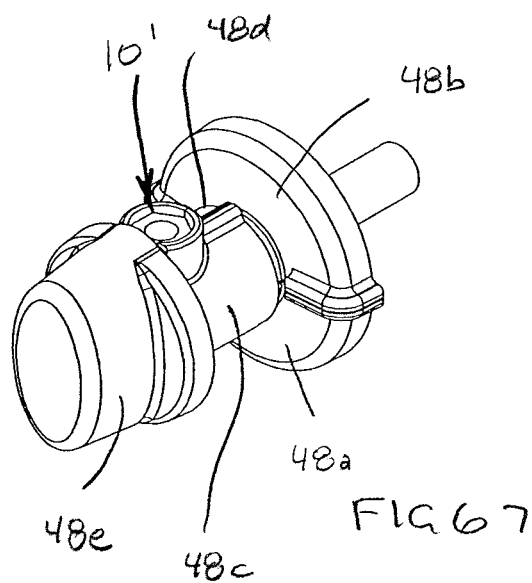

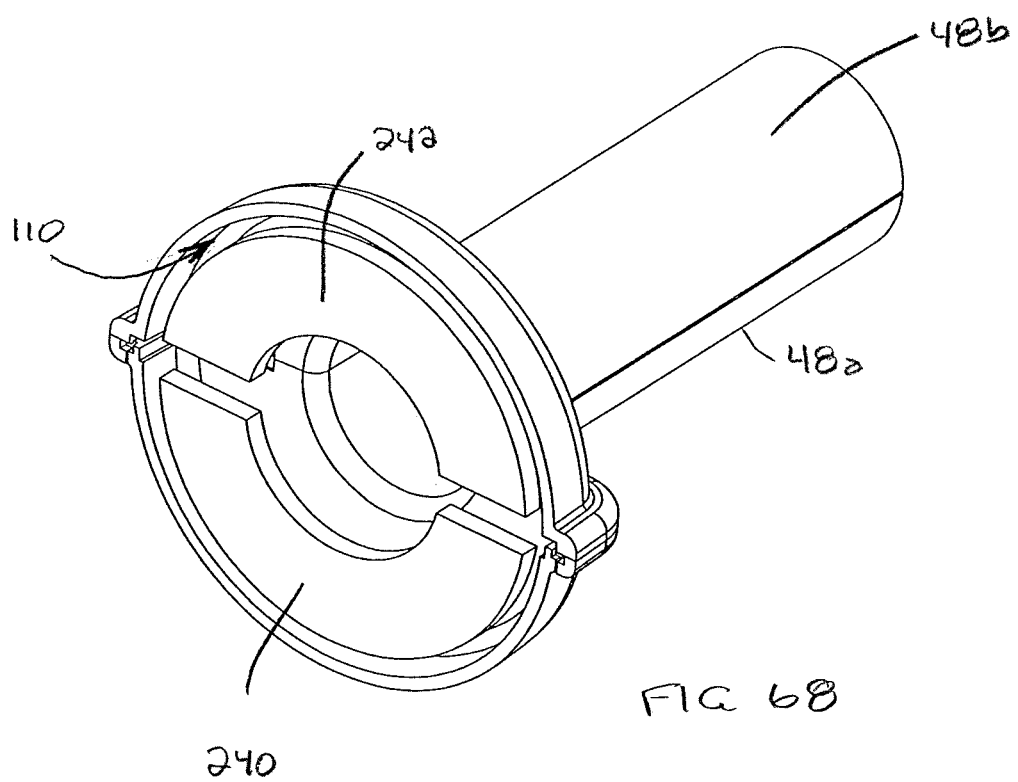

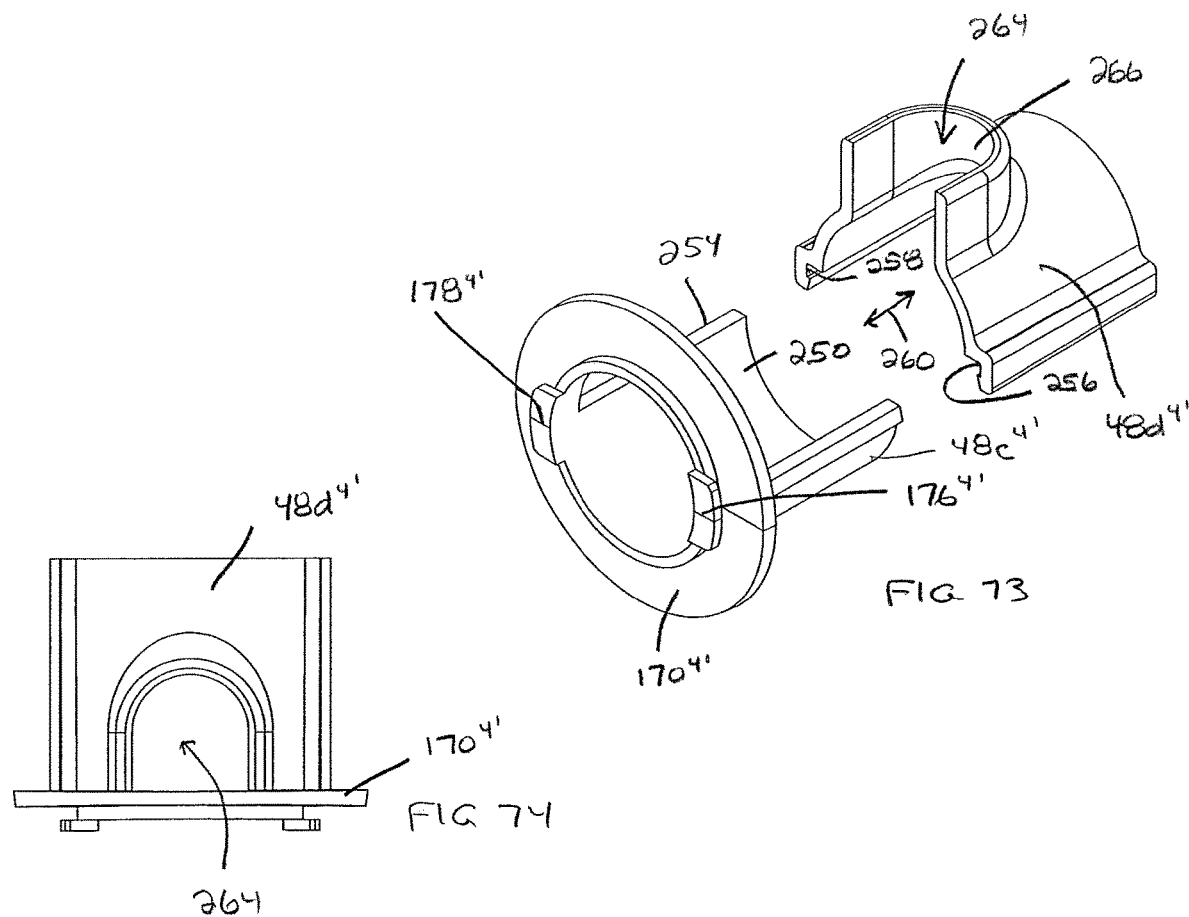
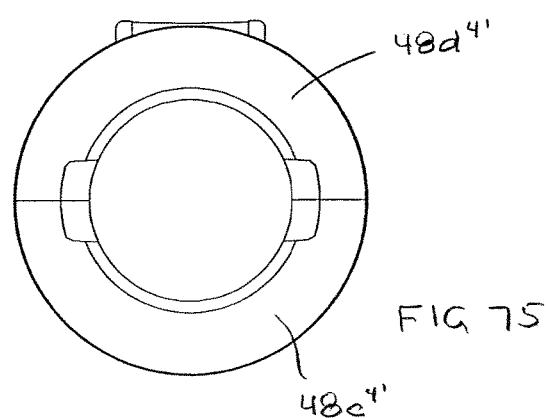

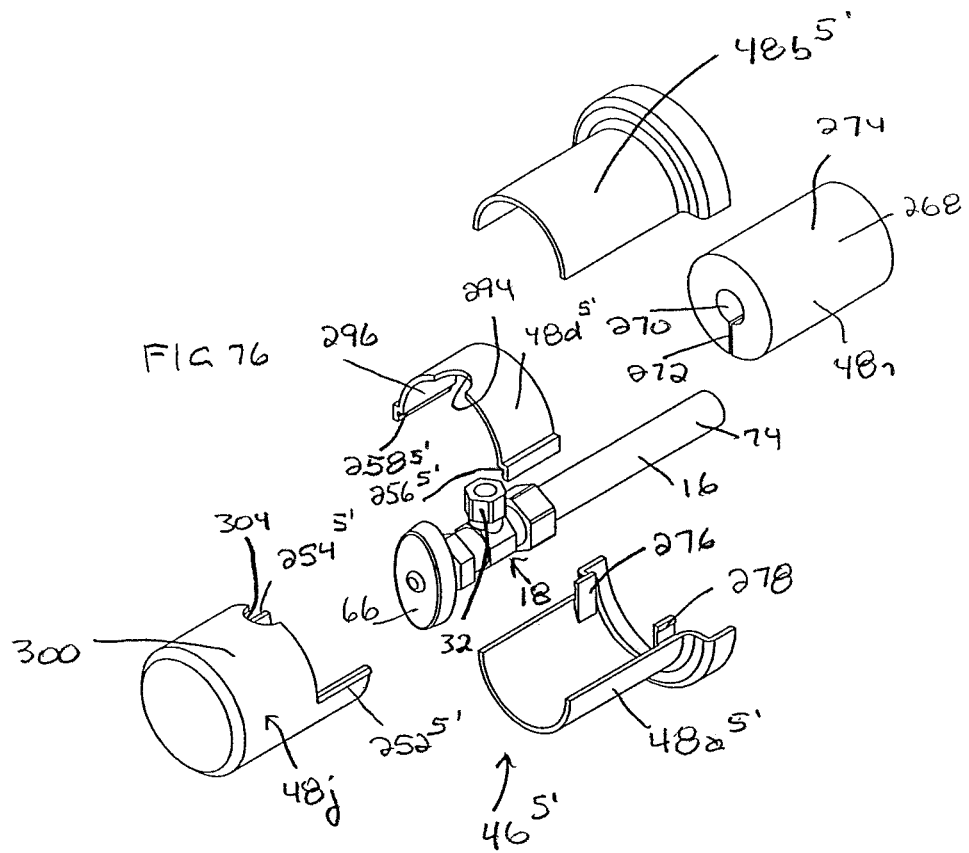
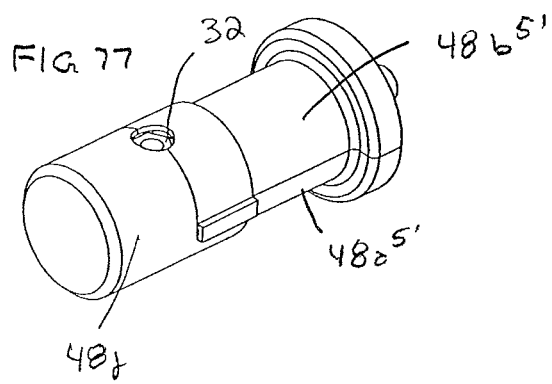
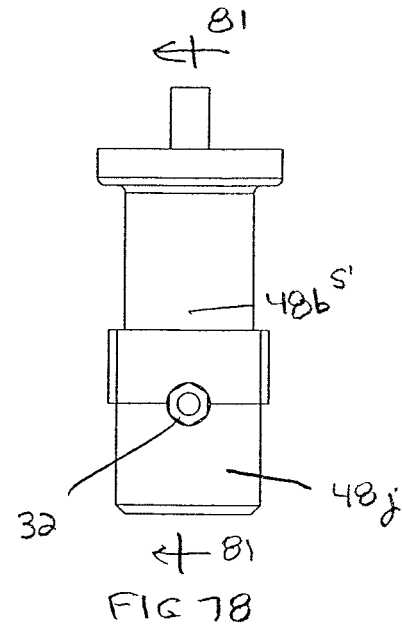

METHOD OF MODIFYING A FLUID SUPPLY FEATURE

BACKGROUND OF THE INVENTION

Field of the Invention

This invention relates to fluid supply features made up of a conduit communicating fluid from a source to a valve through which fluid is delivered to a point of use and, more particularly, to a method of modifying the fluid supply feature through the use of a kit to thereby change at least the appearance of the fluid supply feature.

Background Art

Residential and commercial buildings contain numerous fixtures such as toilets, sinks, tubs, showers, etc. Each such fixture requires a dedicated supply conduit through which fluid from a source is delivered to the fixture. In most instances, to facilitate initial installation and subsequent maintenance, fluid from each supply conduit passes through a shutoff valve from which fluid is directed through a delivery conduit to a fluid receptacle associated with the fixture—be it a tank, basin, etc.

Fluid supply features for tubs and showers are generally hidden inside of walls. The fluid supply feature for sinks may be hidden in a cabinet or potentially exposed if the sink is pedestal or wall-hung. However, fluid supply features associated with toilets and certain sink constructions are generally exposed and remain clearly visible, even in meticulously decorated interiors of homes and business.

In those environments in which portions of the fluid supply feature are exposed to view, typically the supply conduit enters a room through a vertical wall or floor in the vicinity of the fixture—most commonly a toilet and/or sink. If the conduit enters the room through the floor, often a straight shutoff valve is used so that fluid travels in a substantially straight line path through the supply conduit, to and through a valve inlet, and to and from a valve outlet. On the other hand, if the delivery conduit comes out of a vertical wall, it will commonly be connected to an angled valve such that fluid is delivered from the conduit to the valve inlet in a first line and diverts at 90° in discharging from the valve outlet into an appropriate delivery conduit through which fluid is communicated to the fixture reservoir.

The angled shutoff valve will commonly have an operating handle that is graspable and turned around an axis oriented generally parallel to the conduit connected to the valve inlet.

A multitude of different types of valves is available with different constructions allowing connection between the valve inlet and a supply conduit and the valve outlet and the delivery conduit. Generally, these connections are characterized as press-to-connect, compression, flare, threaded, soldered, glued, etc.

The delivery conduct can likewise take a multitude of different forms. For example, it may be a flexible hose with reinforcement, flexible plastic, rigid or bendable copper, brass pipe, etc. The delivery conduit often is joined to the valve using a connector including a compression nut.

Shutoff valves vary over a wide range in terms of how they are constructed and how they are operated. For example, ball valves are commonly made with small graspable handles with various shapes and can be shut off with a partial handle turn, while screw valves generally require multiple turns to be shut off and a larger handle for more leverage. Typically, the ball valve handle is positioned tighter to the body of the valve, with the screw valve having a longer stem such that the handle is set further away from the valve body when the valve is in an open state and closer to the valve body when in the closed state.

During construction, openings are provided in the vertical wall/floor with a diameter typically a good bit larger than the diameter of the supply conduit to facilitate assembly of the components of the fluid supply feature. As such, there is normally an appreciable gap around the supply conduit in the particular wall or floor through which it is directed.

For purposes of aesthetics, an escutcheon plate, with a fixed shape or hinged halves, is used to surround the supply conduit at the location where it departs from the floor/wall. An inside edge of the escutcheon plate is at least nominally matched to the diameter of the outer surface of the supply conduit. The escutcheon plate has an outer diameter significantly greater than that of the conduit so that the escutcheon plate spans across any gap around the supply conduit to fully cover the same. With a hinged design, the escutcheon plate can be installed after the fluid supply feature is otherwise completed; whereas, a fixed shape requires passage of a free end of the supply conduit therethrough during installation.

The supply conduit may be made from a number of different materials and may have different diameters. For example, the supply conduit can be made from copper, brass, iron, plastic, rubber, etc. The exposed length of the supply conduit within a space may vary depending upon the relationship between the location at which the supply conduit enters the space and the location of the particular fixture therein. The supply conduit may be cut to project only a short distance away from the surface through which it projects on the floor/wall or extend a substantial distance into the room whereby more of the supply conduit is exposed to view. The connection between the valve outlet and fixture may rely on the adaptability of the delivery conduit communicating from the valve outlet, which may be formable and of substantial length.

While the particular fluid supply feature to which the present invention is directed is not in any way limited to fixture type or environment, its operation and utility can be appreciated by explaining use thereof in an exemplary bathroom with an exemplary fixture in the form of a toilet. Since bathrooms commonly have showers and/or tubs that generate steam, they are generally high humidity environments. Concern about germ control inspires the use of many cleaning products with chemicals that destroy conventional finishes, such as chrome, on metal parts associated with most conventional fluid supply features. Bathroom fixtures themselves are generally designed to be sanitary and easily cleaned and wiped down. This is accomplished by having smooth exposed surfaces without large numbers of sharp corners or crevices that might accumulate germs and be less accessible as when cleaning with conventional cloths and brushes.

Typically, the escutcheon plate, supply and delivery conduits, and valves that are directly exposed in the bathroom environment, are not plated to the same standards as fixtures, such as faucets, that they supply. Accordingly, the chrome plating associated with parts on fluid supply features generally fades and/or flakes. Uncoated parts commonly rust and corrode, as a result of which parts of the fluid supply feature have a poor appearance compared to the ceramic and other differently finished portions of fixtures such as sinks and toilets. The shutoff valves themselves are prone to the same rusting/corroding upon being exposed to cleaning chemicals and moisture over time. This may produce unsightly pitting of exposed surfaces. Further, supply conduits exposed in a room can become unsightly, as when copper becomes oxidized or is accidentally hit with a brush while a bathroom is being painted. A typical fluid supply feature has a relatively intricate exposed contour that creates surfaces that are difficult to access and clean. Thus, they are prone to being unsanitary and unsightly, with the poor appearance generally deteriorating over time.

Generally, the only practical way to improve the appearance of a conventional fluid supply feature communicating, as to a toilet, is to change one or more of the parts thereof. However, the poor appearance of this overall feature is generally tolerated due to the difficulty in replacing the rusty, dirty, and corroding escutcheon plate, supply and delivery conduits, and valve, since replacement typically potentially requires that a water main be turned off for a building, after which strategic draining must occur before the parts can be separated and replaced.

Aside from the generally unsightly appearance of parts of a fluid supply feature, particularly over time, even if the parts of the fluid supply feature were selected at time of installation to be aesthetically pleasing, over time styles may become outdated. Whereas one may make an investment in a fluid supply feature that matches faucet valves at time of initial installation, a decision to change discrete parts, as in a bathroom, may result in a design mismatch. For example, if a faucet is changed on a sink to change the appearance thereof, a mismatch with the fluid supply feature may result. This is a common problem, since motif changes over time as different finishes come and go. For example, exemplary finishes may be gold, chrome, brushed nickel, oil rubbed bronze, etc.

As noted above, aside from the visual issues associated with having exposed fluid supply features, the unshielded exposed surfaces become more prone to deterioration over time as they become exposed to cleaning chemicals, condensation, paint, etc.

A further problem associated with conventional fluid supply features is that the gap around the supply conduit where it extends through the floor/wall creates a vent opening between the space within which the fixture resides and one or more other contiguous spaces in the particular structure. In the case of fire, this venting may promote airflow that can provide oxygen between the fixture space and other spaces, such as an attic or basement, which may enhance fire propagation. The escutcheon plate is designed only to aesthetically extend over the gap but does not provide a seal to prevent communication of air between the space within which the fixture resides and other contiguous spaces.

In spite of the fact that the above problems are well known, regular observance of existing fluid supply features in homes and businesses demonstrates that most persons are willing to contend with the above problems rather than address them. This is particularly evident when observing rusted/corroded parts on fluid supply features in clear view together with very expensive fixtures themselves designed with an aesthetic focus.

SUMMARY OF THE INVENTION

In one form, the invention is directed to a method of modifying a fluid supply feature having a conduit communicating fluid from a source to a valve through which fluid is delivered to a point of use. The method includes the steps of: obtaining a kit having a plurality of components; and interconnecting the plurality of components with each other and at least one of the conduit and valve to thereby maintain the plurality of components in an operative relationship wherein the plurality of components overlie an exposed surface on at least one of the valve and conduit.

In one form, the point of use is one of: a) a reservoir on a toilet tank; and b) a sink/basin.

In one form, the plurality of components are configured to be maintained in the operative relationship without requiring use of separate fasteners.

In one form, the conduit has a length. The plurality of components includes first and second components. The step of interconnecting the plurality of components involves connecting the first and second components to each other so that at least parts of the first and second components cooperatively extend fully around at least a portion of the length of the conduit with the plurality of components in the operative relationship.

In one form, the plurality of components includes third and fourth components. The step of interconnecting the plurality of components involves placing at least a part of the valve between at least parts of the third and fourth components with the plurality of components in the operative relationship.

In one form, the valve has an operating handle. The plurality of components includes a fifth component defining a receptacle. The step of interconnecting the plurality of components involves directing at least a part of the operating handle into the receptacle on the fifth component with the plurality of components in the operative relationship.

In one form, the step of interconnecting the plurality of components involves connecting the fifth component to at least one of the third and fourth components with the plurality of components in the operative relationship.

In one form, the step of connecting the fifth component to the at least one of the third and fourth component involves: a) connecting a sixth component to the at least one of the third and fourth components; and b) connecting the fifth component to the sixth component with the plurality of components in the operative relationship.

In one form, the step of connecting the sixth component to the at least one of the third and fourth components involves connecting the sixth component to each of the third and fourth components so as to thereby maintain the third and fourth components against separation from each other with the plurality of components in the operative relationship.

In one form, the step of connecting the fifth component to the sixth component involves causing the fifth and sixth components to be magnetically attracted to each other with the plurality of components in the operative relationship.

In one form, the operating handle is turned around an axis to thereby change a state of the valve. With the at least part of the handle directed into the receptacle on the fifth component, the handle and fifth component are in a keyed relationship such that turning of the fifth component around the handle axis causes the handle to be turned around the handle axis.

In one form, the conduit projects through an opening at a surface. The parts of the first and second components cooperatively extending fully around the length of the conduit have a first effective outer diameter. A separate part of at least one of the first and second components defines a flange: a) extending at least partially around the conduit; b) having a second effective diameter greater than the first effective diameter; and c) overlying the opening at the surface through which the conduit projects with the plurality of components in the operative relationship.

In one form, the method of modifying a fluid supply feature further includes the step of adhering the flange to the surface through which the conduit projects.

In one form, there are cooperating connectors on at least one of: a) the first and second components; and b) the third and fourth components that consistently align the at least one of: a) the first and second components; and b) the third and fourth components with the plurality of components in the operative relationship.

In one form, the cooperating connectors on the at least one of: a) the first and second components; and b) the third and fourth components are configured to allow the at least one of: a) the first and second components; and b) the third and fourth components to be snap fit together with the plurality of components in the operative relationship.

In one form, the conduit has a length. The method further includes the step of removing a portion of at least one of the first and second components to thereby change a degree of coextension of the at least one of the first and second components over the length of the conduit with the plurality of components in the operative relationship.

In one form, the valve has an outlet connector. With the plurality of components in the operative relationship, the third and fourth components cooperatively define a receptacle for at least a part of the valve outlet connector.

In one form, with the plurality of components in the operative relationship at least one of the first and second components is in overlapping relationship with at least one of the third and fourth components along the length of the conduit.

In one form, the valve has at least one shoulder facing in a lengthwise direction with respect to the conduit. At least one of the third and fourth components has a shoulder that is in confronting relationship with the at least one shoulder to limit relative movement between the valve and the at least one of the third and fourth components along the length of the conduit.

In one form, the plurality of components includes joinable components making up the fifth component. The step of interconnecting the plurality of components involves joining the joinable components making up the fifth component together with a portion of at least one of the third and fourth components between the joinable components making up the fifth component with the plurality of components in the operative relationship.

In one form, the invention is directed to the combination of: a fluid supply feature having a conduit communicating fluid from a source to a valve through which fluid is delivered to a point of use; and a plurality of components interconnected with each other and at least one of the conduit and valve to thereby be maintained in operative relationship, wherein the plurality of components overlie an exposed surface on at least one of the valve and conduit.

BRIEF DESCRIPTION OF THE DRAWINGS

FIG. 1 is a schematic representation of one form of fluid supply feature configured to direct fluid from a source to a point of use and with which the present invention can be used;

FIG. 2 is a schematic representation of a fixture at which the point of use in FIG. 1 is located;

FIG. 3 is a schematic representation showing further details of the valve on the fluid supply feature in FIG. 1;

FIG. 4 is a schematic representation of a connection between a valve body and the conduit on the fluid supply feature in FIG. 1;

FIG. 5 is a schematic representation of a connection between the body on the valve on the fluid supply feature in FIG. 1 and a fixture as shown schematically in FIG. 2;

FIG. 6 is a schematic representation of a connection between a body on the valve on the fluid supply feature in FIG. 1 and a delivery conduit that communicates between that body and a fixture, as shown schematically in FIG. 2;

FIG. 16 is a perspective view of first and second components, making up the kit as shown in FIGS. 14 and 15, interconnected with each other and a surface from which an associated supply conduit projects;

FIG. 17 is a fragmentary, perspective view of the components in FIG. 16 relatively moved from the FIG. 16 position so that cooperating connectors thereon are separated from each other;

FIG. 18 is an enlarged view of the connectors within the circle of FIG. 17;

FIG. 19 is a cross-sectional view of the interconnected components taken along line 19-19 of FIG. 16;

FIG. 20 is an enlarged view of the portion of the interconnected components within the circle in FIG. 19;

FIG. 29 is a perspective view of third and fourth components in the kit in FIGS. 14 and 15, with the components interconnected and in operative relationship with respect to the valve in FIG. 14;

FIG. 30 is a plan view of the interconnected components in FIG. 29;

FIG. 31 is an exploded, perspective view of the components in FIGS. 29 and 30 in relationship to the valve in FIG. 14;

FIG. 62 is a perspective view of the fluid supply feature and kit components as in FIG. 14 with the components in the inventive kit interconnected with each other and in operative relationship;

FIG. 67 is a view corresponding to the view in FIG. 62 but with the kit components adapted to be interconnected with each other and in operative relationship with each other and the fluid supply feature in FIG. 11;

FIG. 68 is an enlarged, perspective view of the first and second components as in FIG. 14 in the inventive kit with intumescent pads incorporated therein;

FIG. 73 is an enlarged, exploded, perspective view of modified forms of components as shown in FIGS. 35 and 39;

FIG. 74 is a top view of the components in FIG. 73 in interconnected relationship;

FIG. 75 is a front elevation view of the interconnected components in FIG. 74;

FIG. 76 is an exploded perspective view of a further modified form of kit, according to the invention, in relationship to a fluid supply feature as shown in FIG. 10;

FIG. 77 is a view as in FIG. 76 with the components interconnected and in operative relationship with respect to the fluid supply feature in FIG. 76;

FIG. 78 is a plan view of the interconnected components in FIG. 77;

DETAILED DESCRIPTION OF THE PREFERRED EMBODIMENT

Figure 7:
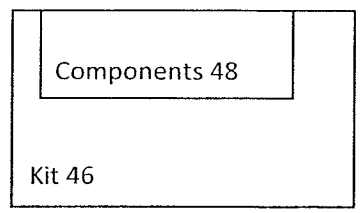
FIG. 7 is a schematic representation of a kit including a plurality of components, according to the present invention.

The present invention is directed to a fluid supply feature, as shown schematically at 10 in FIG. 1. The fluid supply feature 10 is configured to deliver fluid from a source 12 of the fluid to a point of use 14. The fluid supply feature 10 consists of a conduit/supply conduit 16 that communicates fluid from the source 12 to a valve 18 through which the fluid is delivered to the point of use 14.

The components in FIG. 1 are shown in a schematic form to broadly encompass the environment in which the present invention is intended to be used. The precise details of the fluid supply feature 10, the fluid source 12, and the point of use 14, are not critical to the present invention. It suffices to say that the present invention can be practiced in any environment in which a supply conduit 16 and valve 18, used to deliver fluid from a source to a point of use, have exposed surfaces which are viewable with a fixture 20, as shown schematically in FIG. 2, having the associated point of use 14.

For example, the fixture 20 may be a toilet, a sink, a tub, a stall, etc., having a volume within which fluid from the source 12 is delivered. The point of use 14 may thus be a reservoir on a toilet tank, a sink/basin, a shower stall volume, a tub basin, etc.

Again, the schematic showing of parts is made so as not to limit the specific environment for the invention.

The schematic showing of the supply conduit 16 is intended to encompass virtually any type of construction capable of communicating a fluid, such as water, between two locations. As noted in the Background portion herein, the supply conduit 16 may be metal or non-metal, in the former case potentially being copper, brass, iron, etc. In the latter case, the material may be plastic, rubber, reinforced rubber, etc.

As shown in FIG. 3, the schematically depicted valve 18 in FIG. 1 consists of a body 22 with an inlet 24 and an outlet 26.

As shown schematically in FIG. 4, the valve body 22 has an associated connector 28 at the inlet 24 that cooperates with a connector 30 on the supply conduit 16. The connectors 28, 30 may take any form, as described in the Background portion above, or other forms not specifically identified. The connectors 28, 30 may be separate from or integral with the body 22 and supply conduit 16, respectively. It is also contemplated that there may be a permanent connection between the supply conduit 16 and body 22 at the inlet 24.

As shown schematically in FIG. 5, a connector 32 at the valve outlet 26 may cooperate with a connector 34 associated with the fixture 20. The particular construction of the connectors 32, 34 is not limited. The connectors 32, 34 may be separate from and/or part of the valve body 22 and fixture 20, respectively. A permanent connection between the connectors 32, 34 is contemplated.

In an exemplary form, as described in greater detail hereinbelow and shown schematically in FIG. 6, a delivery conduit 36 communicates fluid from the outlet 26 on the valve body 22 to the fixture 20. A connector 38 at the inlet end 40 of the delivery conduit 36 cooperates with the connector 32 at the outlet 26 on the valve body 22. A connector 42 at the outlet end 44 of the delivery conduit 36 cooperates with the connector 34 associated with the fixture 20.

The connectors 38, 42 may be separate from or integrally formed with the delivery conduit 36. The connector 38 may be releasably joined to the connector 32 or this connection may be permanent. Similarly, the connectors 42, 34 may be releasably joined or their connection may be permanent. Again, there is no limitation as to the nature of the connectors 38, 42, as that particular detail is not critical to the present invention.

As shown in FIG. 7, the present invention contemplates the use of a kit 46 consisting of a plurality of components 48. The precise number and configuration of the components 48 is not critical to the present invention and thus they are shown schematically in FIG. 7.

Figure 8:
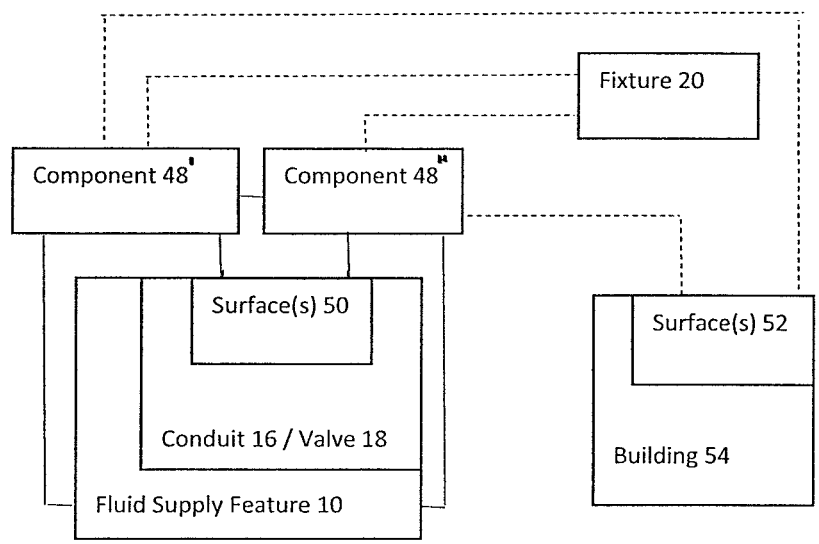
FIG. 8 is a schematic representation of a fluid supply feature as in FIG. 1 and showing components on the kit interconnected with: a) each other; b) the fluid supply feature made up of the conduit and valve as shown schematically in FIG. 1; c) the fixture in FIG. 2; and d) a surface on a building from which the conduit in FIG. 1 projects.

In FIG. 8, a schematic representation of the contemplated interconnection of the components 48 with the fluid supply feature 10 is shown for first and second of the components, identified as 48' and 48". The components 48', 48" interconnect also with each other. The components 48' and 48" are configured to interconnect with each other and/or the supply conduit 16 and/or the valve 18 on the fluid supply feature 10 to maintain the components 48', 48" in operative relationship with respect to the fluid supply feature 10. In this operative relationship, at least one of the components 48', 48", and preferably both of the components 48', 48", overlie at least one exposed surface 50 on the supply conduit 16 and/or valve 18.

One or both of the components 48', 48" may also interconnect with the fixture 20 to maintain the components 48', 48" in operative relationship. Still further, one or both of the components 48', 48" may interconnect with one or more surfaces 52 on a building 54 whereat the fixture 20 is located to maintain the components 48', 48" in operative relationship. The surface(s) 52 typically includes one from which the supply conduit 16 projects into a space within which the fixture 20 is located.

Figure 9:
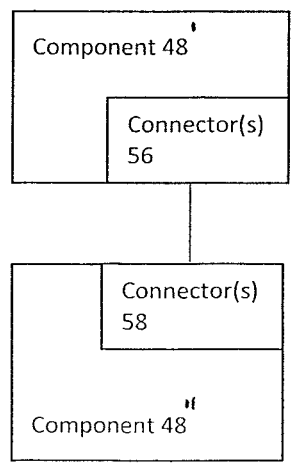
FIG. 9 is a schematic representation of connectors that cooperate between interconnecting components making up the inventive kit.

As shown in FIG. 9, the exemplary components 48', 48", if interconnected, may each have one or more connectors 56, 58 that interact to align and/or permanently or releasably maintain the components 48', 48" in the aforementioned operative relationship.

It should be emphasized that the schematic depiction of the components 48', 48" and connectors 56, 68 is intended to encompass virtually an unlimited number of different forms of the connectors 56, 58 that may cooperate for purposes of alignment, to effect releasable or permanent snap connection, to effect press connection, etc.

In FIGS. 10-13, exemplary prior art fluid supply features 10, 10', 10", 10''' are depicted and are configured as typically incorporated into a fixture 20 in the form of a toilet with a tank 60 defining a reservoir/point of use 14 at which water is contained. The supply conduit 16 projects through a surface opening 62, as through a vertical wall, and projects a length L therefrom into a space 64 whereat the fluid supply feature 10 remains visible. The supply conduit 16 is connected to a shutoff valve 18. The valve 18 has a body 22 defining the inlet 24 and outlet 26. The connector 28 at the inlet 24 includes a nut that is threadably connected to an end of the supply conduit 16. The valve body 22 diverts the incoming fluid flow 90° to discharge vertically at the outlet 26. The delivery conduit 36 is connected to the valve 18 at the outlet 26 through a connector 32, also including a nut. In this case, a compression type connection is depicted, which detail is not critical to the present invention.

The valve 18 has an operating handle 66 with a generally oval perimeter shape that is readily graspable to turn the handle 66 around an axis 68 selectively in opposite directions to place the valve 18 in "on" and "off" states. The depicted valve is of the aforementioned "screw" type that generally requires multiple turns to fully change the state of the valve.

A disk-shaped, one-piece escutcheon plate 70 has an opening 72 through which the supply conduit 16 passes and has a significantly greater diameter than that of the outer surface 74 of the supply conduit 16, thereby allowing the escutcheon plate 70 to overlie/cover any gap region between the bounding edge of the surface opening 62 and the outer surface 74 of the supply conduit 16.

Figure 10:
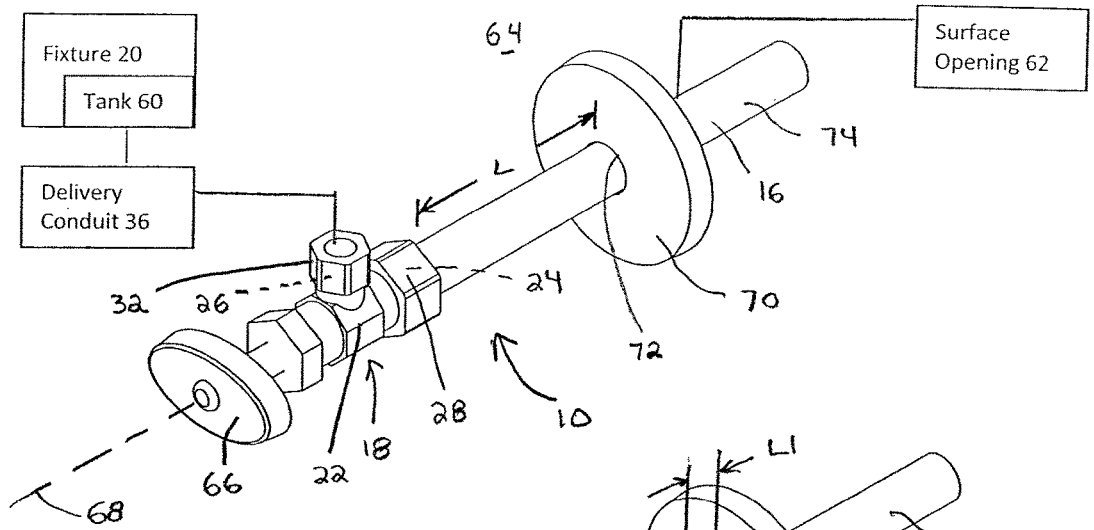
FIGS. 10-13 are perspective views showing different exemplary known forms of the fluid supply feature as shown schematically in FIG. 1.
Figure 11:
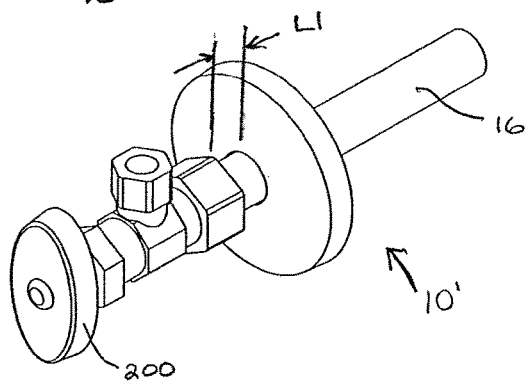

The fluid supply feature 10' in FIG. 11 differs from the fluid supply feature 10 only by reason of the length of the supply conduit 16 projecting into the volume occupied by the fixture 20. The fluid supply feature 10' has a projecting length L1 for the supply conduit 16 that is significantly less than the corresponding distance L in FIG. 10. Alternatively, there may be no significant, or no, projecting length of the supply conduit 16 (L=0).

Figure 12:
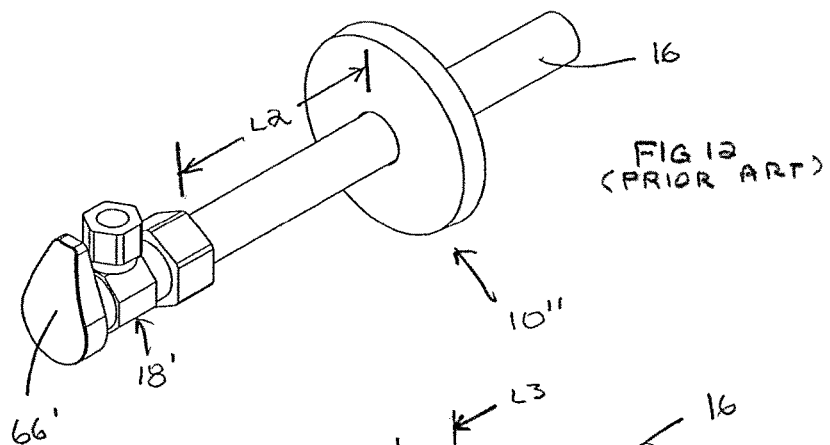

The fluid supply feature 10" in FIG. 12 is substantially the same as that in FIG. 1, with the exception that the valve 18' has a different configuration of operating handle 66'. While this handle configuration could be used on a screw-type valve, as depicted, it is intended to be shown in cooperation with a ball valve which requires movement through a lesser angular range to change the state of the valve 18' between "on" and "off" states.

The supply conduit 16 on the fluid supply feature 10" projects into the volume occupied by the fixture 20 a distance L2.

Figure 13:
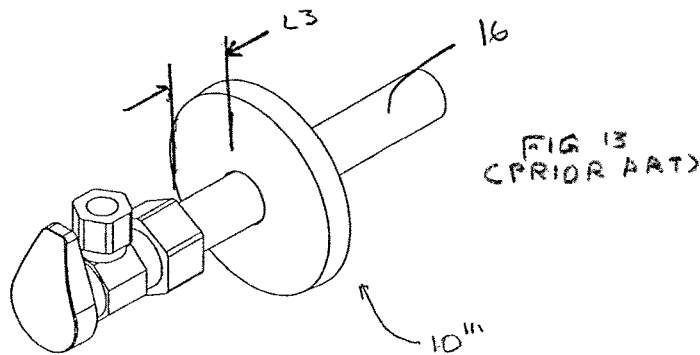
Figure 14:
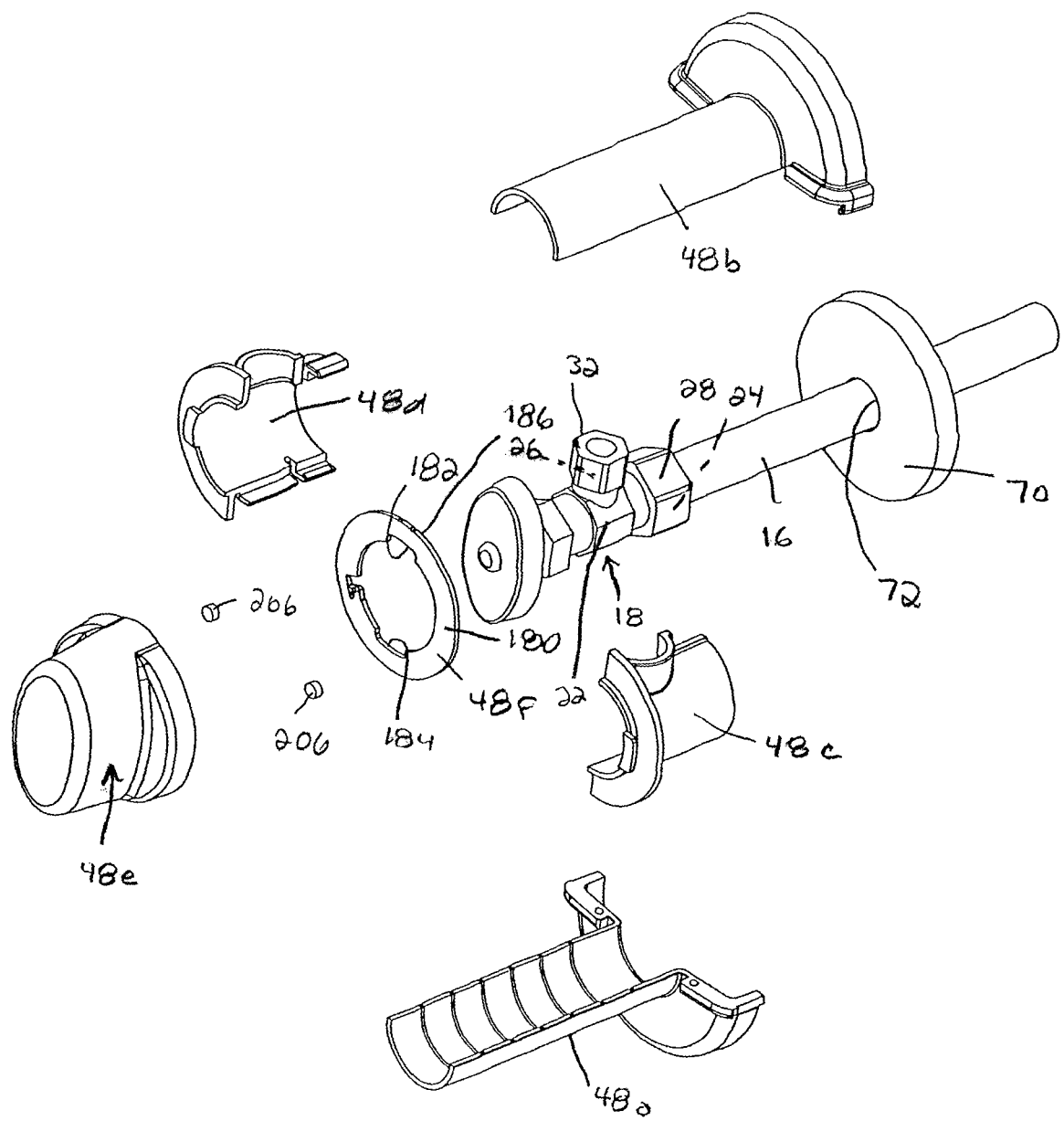
FIG. 14 is an exploded, perspective view of one form of the inventive kit in relationship to the fluid supply feature in FIG. 10.
Figure 15:
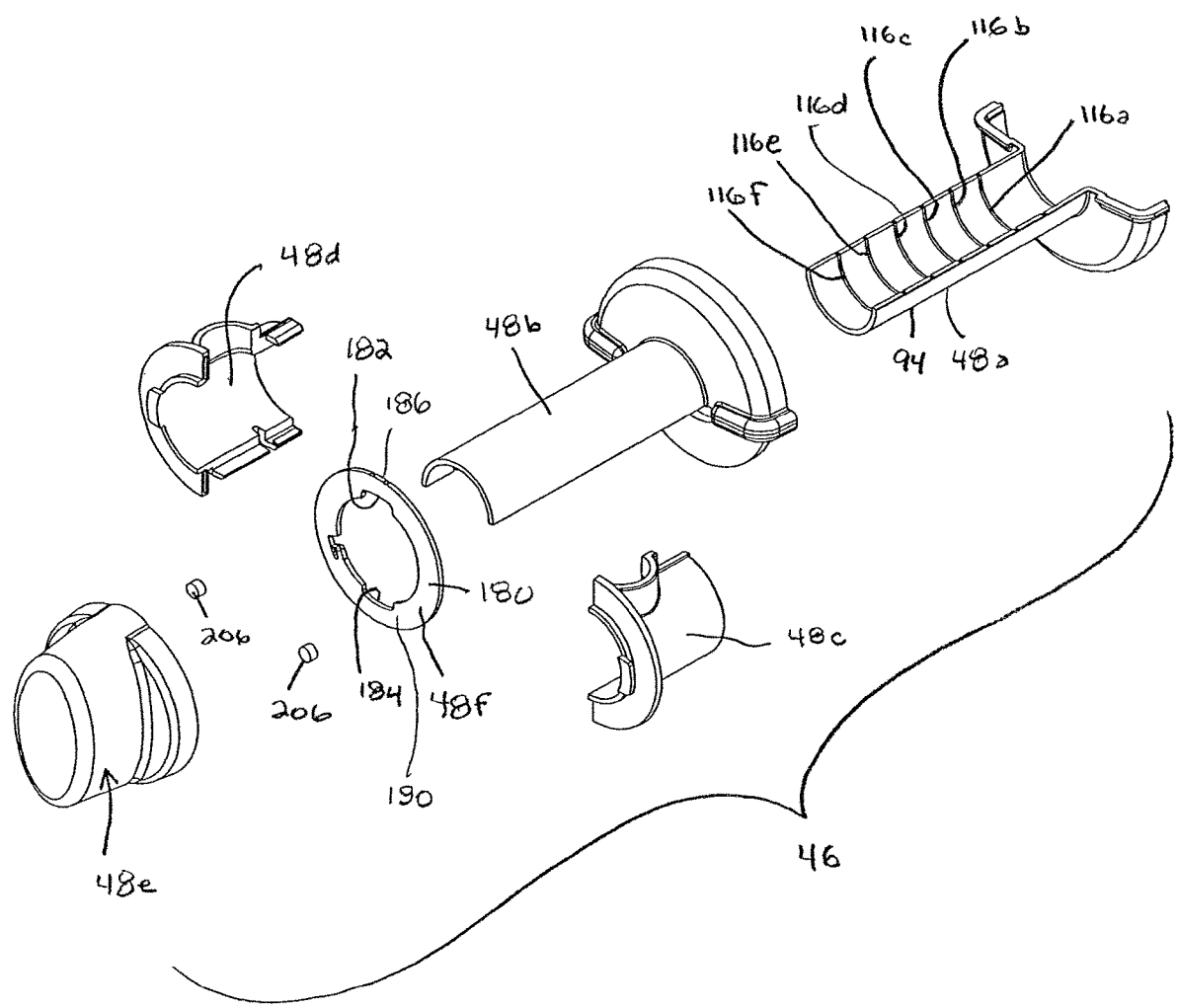
FIG. 15 is a view of the kit components in FIG. 14 absent the fluid supply feature.
Figure 22:
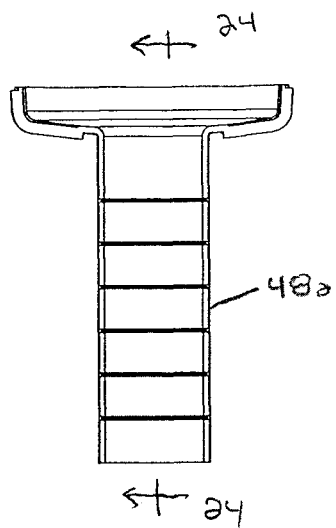
FIGS. 21-23 are different perspective views of the second component as shown in FIGS. 16-20.
Figure 21:
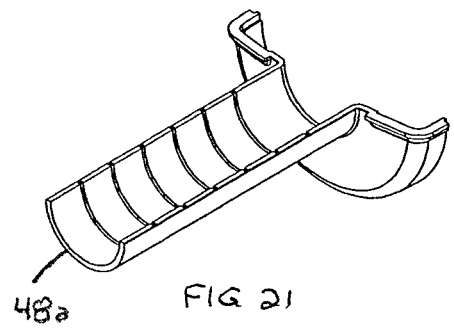
Figure 23:
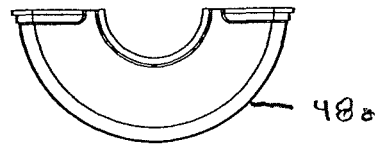
Figure 24:
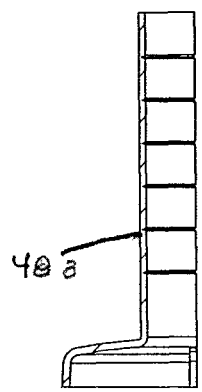
FIG. 24 is a cross-sectional view of the second component taken along line 24-24 of FIG. 22.
Figure 26:
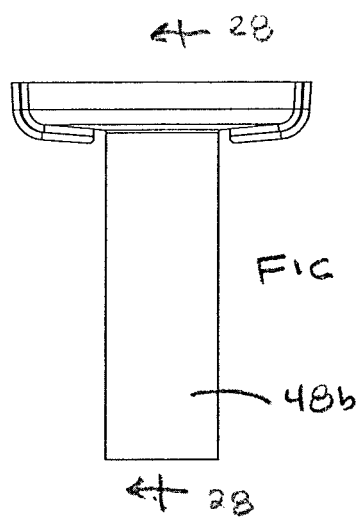
FIGS. 25-27 are different perspective views of the first component as shown in FIGS. 16-20.
Figure 25:
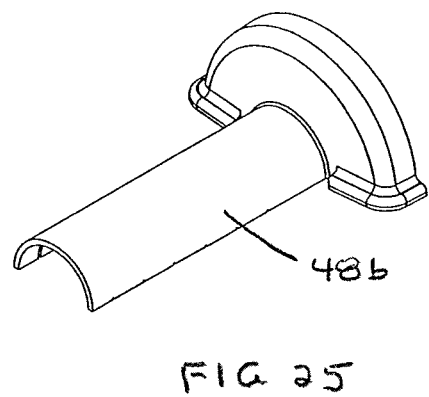
Figure 27:
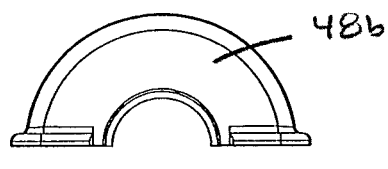
Figure 28:
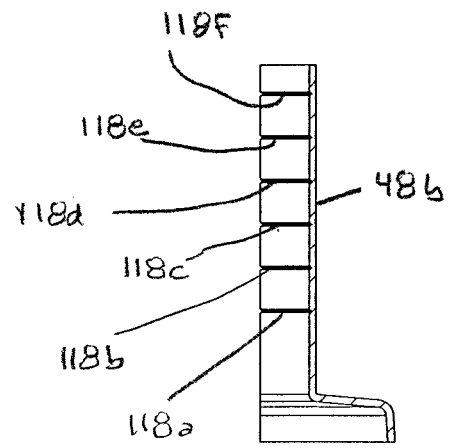
FIG. 28 is a cross-sectional view of the first component taken along line 28-28 of FIG. 26.

The fluid supply feature 10''' in FIG. 13 differs from the fluid supply feature 10" in FIG. 12 principally by reason of the supply conduit 16 having a projecting length L3 that is less than the corresponding length L2 in FIG. 12.

The fluid supply features 10, 10', 10", 10''' are only exemplary in nature of the many fluid supply features with which the inventive kit 46 can be used.

Referring now to FIGS. 14-50 and 62-66, one specific form of the kit 46 is depicted to be placed in operative relationship with each other and the exemplary fluid supply feature of FIG. 10. It should be made clear that it is contemplated that the inventive method of modifying a fluid supply feature may be practiced with as few as two of the components 48 or any number greater than two. Use of more than two of the components is described hereinbelow. Any two of the components described herein may be used by themselves. It is also contemplated that the kit 46 may be made up of additional components not specifically shown.

The kit 46, as depicted in the one form, consists of a first component 48a and a second component 48b that are interconnected with each other and the combined supply conduit 16 and valve 18 on the exemplary fluid supply feature 10 with the components 48a, 48b in operative relationship, as shown in FIGS. 62-66. The general overall shapes of the components 48a, 48b are mirror images of each other. In the operative relationship for the components 48a, 48b, the components 48a, 48b cooperatively define a cylinder 76 and a radially enlarged, ring-shaped flange 78 that is concentric with the axis 80 of the cylinder 76 at one end 82 thereof.

The components 48a, 48b are aligned and interconnected in their operative relationship by incorporating wrapped ribs/connectors 84 at diametrically opposite locations on a portion 86 of the component 48b that defines part of the flange 78. The ribs 84 are received one each in complementary receptacles/connectors 88 on a portion 90 of the component 48a defining the remainder of the flange 78.

As depicted, curved portions 92, 94 respectively on the components 48a, 48b and cooperatively defining the cylinder 76, have curved concave surfaces 96, 98 together matched at least nominally in shape to the outer surface 74 of the supply conduit 16 and greater in diameter.

In the depicted embodiment, downwardly facing edges 100 of the curved portion 92, defined at diametrically opposite sides of the axis 80, are abuttable to upwardly facing edges 102 defined on the portion 94 at diametrically opposite locations with the components 48a, 48b in operative relationship. The components 48a, 48b in operative relationship loosely surround the conduit surface 74.

The ribs 84 can be advanced into the receptacles 88 by offsetting the component 48a axially from the component 48b, as seen at FIG. 18, with the supply conduit 16 located between the surfaces 94, 96. The component 48a can then be moved axially in the direction of the arrow 104 in FIG. 18, thereby to advance the wrapped ribs 84 into the complementary receptacles 88 whereupon the components 48a, 48b are fixed against relative angular movement around the axis 80. At the same time, full seating of the ribs aligns flat edges 106, 108, on the flange 78 and respectively on the components 48a, 48b, flushly in the same plane.

The curved surfaces 96, 98 cooperatively surround a diameter D (FIG. 66) that is slightly greater than the effective diameter D1 of a nut that is part of the valve connector 28. In operative relationship for the components 48a, 48b, the surfaces 96, 98 axially overlap and cooperatively surround the connector 28.

The flange 78 defines a concave receptacle 110 nominally matched to the external surface of the escutcheon plate 70. With the escutcheon plate 70 in the receptacle 110, the flange 78 is supported by the escutcheon plate 70 which bears against a downwardly opening, concave edge bounding part of the receptacle 110.

Accordingly, the interconnected components 48a, 48b in their operative relationship bridge between the escutcheon plate 70 and the connector 28 to thereby be generally coaxially aligned with the axis of the supply conduit 16, which is identified hereinbelow the same as the axis 80 of the cylinder 76.

In a preferred form, the distal end 112 of the unit defined cooperatively by the interconnected components 48a, 48b, does not extend appreciably beyond the end 114 (FIG. 14) of the connector/nut 28 with the components 48a, 48b interconnected and in operative relationship, wherein the flange edges 106, 108 are abutted to the surface 52 from which the supply conduit 16 projects.

It is possible to offer a selection of different pre-formed lengths of the unitary structure made up of the interconnected components 48a, 48b so that the distal end 112 is desirably located.

Alternatively, the components 48a, 48b may be shortened, as by removing a portion thereof. This removal may be effected by any method, such as cutting off a portion, breaking off a portion, etc.

In the depicted form, the curved portions 94, 96 have lines of weakening 116a, 116b, 116c, 116d, 116e, 116f for the portion 94 and 118a, 118b, 118c, 118d, 118e, 118f for the portion 96, spaced axially at strategically selected intervals therealong.

The lines of weakening and nature of the material are selected so that a user can break off corresponding portions of the components 48a, 48b to select an appropriate overall length on site during the installation process. The lines of weakening may also facilitate cutting if it is desired to effect removal thereby as opposed to relying on the frangible nature of the material and snapping off of one or more portions.

It should be noted that while the components 48a, 48b are defined as being one on top and one on the bottom, this is not a requirement, as any angular orientation of the components 48a, 48b might be utilized.

Also, while as depicted the portions 94, 96 extend continuously and fully around the conduit 18, this is not a requirement.

Still further, the components 48a, 48b could be designed so that only parts of the first and second components 48a, 48b cooperatively extend fully around the conduit with the components 48a, 48b in the operative relationship.

In other words, while it is shown that the components 48*a*, 48*b* overlie and fully cover surfaces along which they extend on the escutcheon plate 70 and supply conduit 16, this is not a requirement.

As depicted, the kit 46 includes third and fourth components 48*c*, 48*d*.

The general overall shapes of the components 48*c*, 48*d* are mirror images of each other and designed to be interconnected to define a volume 120 nominally matched to the valve body 22 to partially encase the same. More specifically, the components 48*c*, 48*d* have arcuate body portions 122, 124 that, with the components 48*c*, 48*d* interconnected, cooperatively define a cylindrical shape. This cylindrical shape axially overlaps and surrounds a length of the cylinder 76 to maintain the components 48*a*, 48*b* together thereat. The cylindrical shape may closely surround the components 48*a*, 48*b* to effect interconnection therebetween. This is not a requirement.

The components 48*c*, 48*d* have additional arcuate body portions 126, 128, respectively, that, with the components 48*c*, 48*d* interconnected, cooperatively bound a cylindrical shape that surrounds the valve connector 32, which valve connector 32 includes a nut. The axes of the cylindrical shapes defined cooperatively by the portions 122, 124 and 126, 128 are substantially orthogonal based on the depicted configuration of the valve body 22.

The components 48*c*, 48*d* have cooperating connectors that perform the functions of consistently aligning the components 48*c*, 48*d* and effecting interconnection by allowing them to be snap-connected together to maintain the operative relationship of the components 48*c*, 48*d*, as shown in FIGS. 29 and 62-66.

More specifically, the component 48*c* has an elongate, external rib/connector 130 extending along the full length of the unitary structure defined by the interconnected components 48*c*, 48*d*, parallel to the axis 80. The rib 130 projects radially outwardly from an outer surface 132 of the body portion 122 to define a step with a circumferentially facing shoulder 134. The rib 130 increases in thickness from an edge 136 of the portion 122 up to the shoulder 134.

A corresponding rib/connector 138 is located at a diametrically opposite location and is interrupted lengthwise by the body portion 126.

The component 48*d* has diametrically oppositely situated cam components/connectors 140, 142. Axially adjacent to the cam component 140 is a guiding connector 144.

Upon aligning the components 48*c*, 48*d* in the FIG. 31 relationship, with the valve 18 therebetween, movement of the components 48*c*, 48*d* towards each other causes the rib 130 and guiding component 144 to engage to facilitate consistent guided movement between the parts 48*c*, 48*d* while at the same time stabilizing the interconnected components 48*c*, 48*d*.

The cam component 140 functions as a connector that cooperates with the rib 130 similarly as the rib component 142 cooperates with the rib 138 at the diametrically opposite location. A surface 146 on the rib 130 cooperates with a surface 148 on the cam component 140 to progressively bend an arm 150, upon which the cam component 140 is supported, to allow a shoulder 152 on the cam component 140 to move up to and past the shoulder 134, whereupon the arm 150 springs back to place the shoulders 134, 152 in confronting relationship to complete a snap fit connection. The cam component 142 cooperates with the rib 138 in like fashion.

Once the components 48*c*, 48*d* are snap fit together, the portions 122, 124 cooperatively extend substantially fully around portions of the valve 18 with the portions 126, 128 cooperatively defining a surrounded receptacle for the connector/nut 32.

The concave, inwardly facing surfaces 154, 156 define oppositely facing shoulders which abut to the connector/nut 32 with the interconnected components 48*c*, 48*d* in the operative relationship of FIGS. 29 and 62-66, thereby to limit shifting of the unitary structure, defined by the interconnected components 48*c*, 48*d*, along the length of the supply conduit 16.

Figure 66:
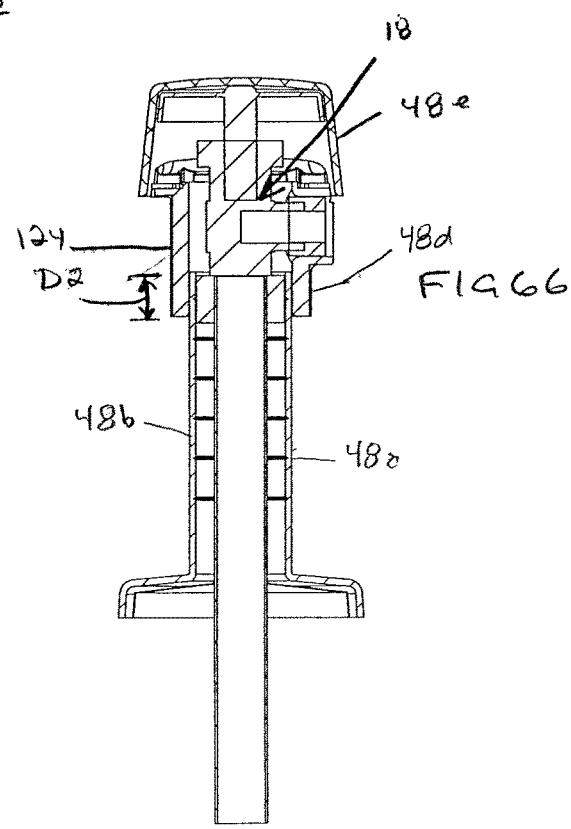
FIG. 66 is a cross-sectional view of the structure in FIG. 62 taken along line 66-66 of FIG. 65.
Figure 69:
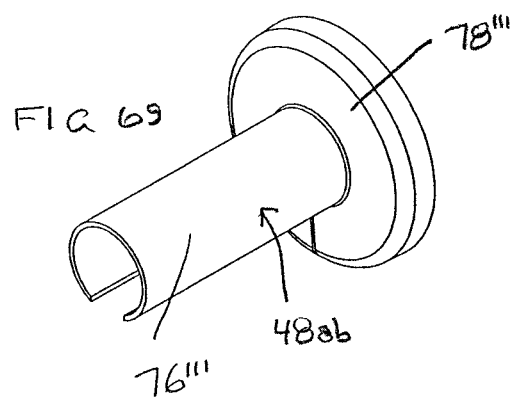
FIGS. 69-72 are different perspective views of a modified form of component that combines two components of the type as shown in FIG. 14 to overlie the fluid delivery conduit.
Figure 70:
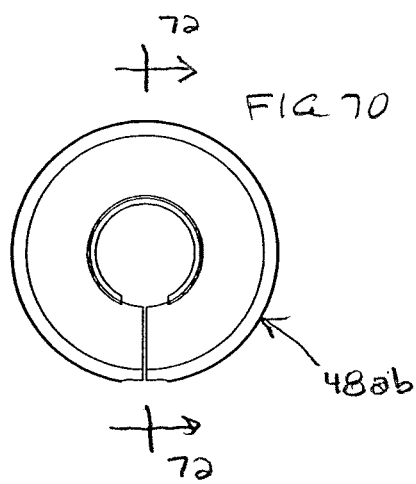
Figure 71:
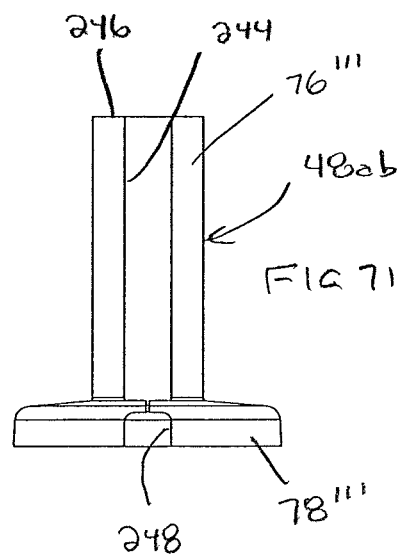
Figure 72:
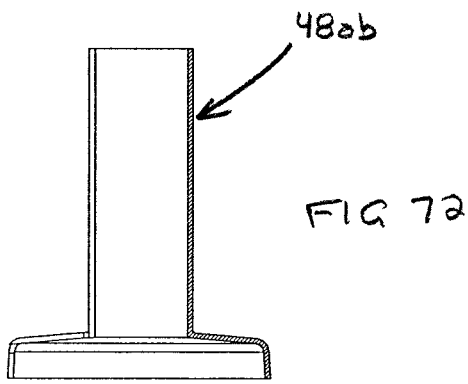
Figure 79:
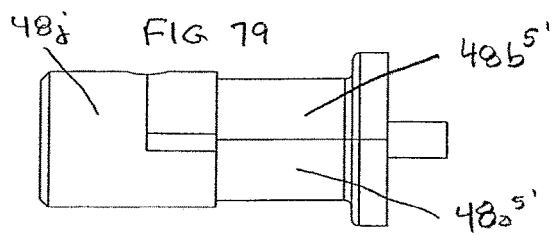
FIG. 79 is a side elevation view of the interconnected components in FIG. 77.
Figure 80:
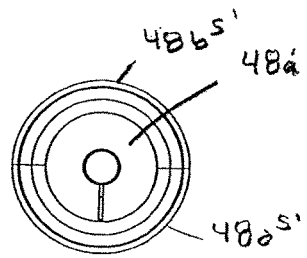
FIG. 80 is a rear elevation view of the interconnected components in FIG. 77.

As seen clearly in FIG. 66, the body portions 122, 124 (one shown) are in axial overlapping relationship with the interconnected components 48*a*, 48*b*. This overlap dimension is identified as D2 in FIGS. 3 and 66. The surrounding body portions 122, 124 maintain the interconnected components 48*a*, 48*b* together in this overlap region.

Figure 39:
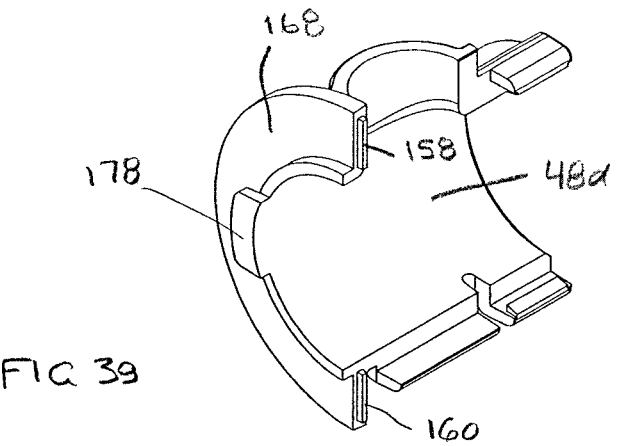
FIGS. 39-42 are enlarged views from different perspectives of the fourth component shown in FIGS. 29-34.
Figure 40:
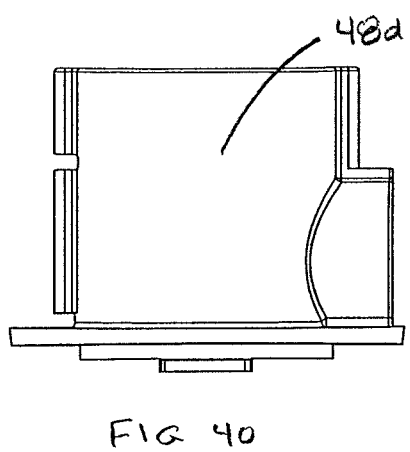
Figure 41:
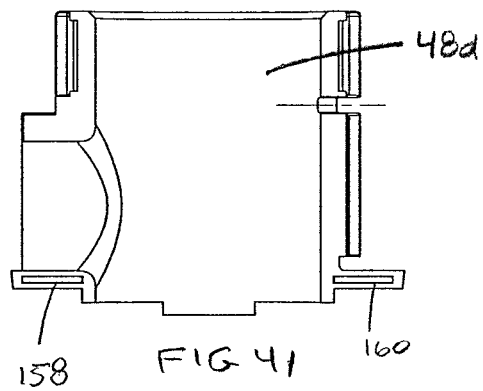
Figure 42:
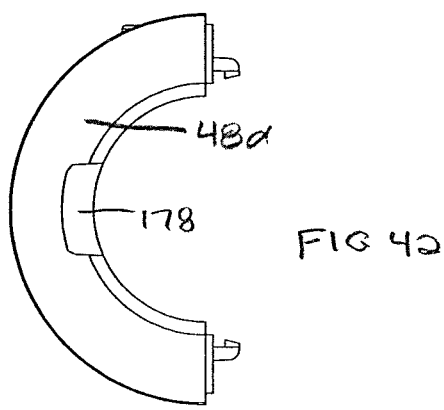
Figure 43:
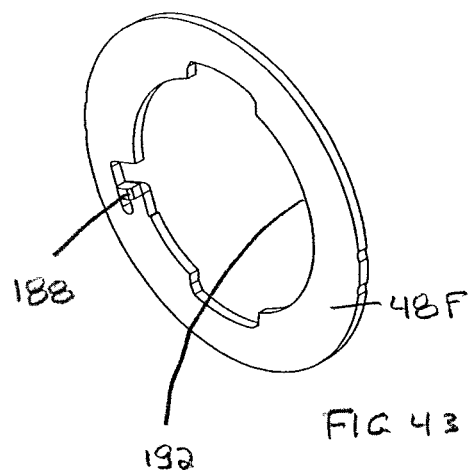
FIG. 43 is a perspective view of a sixth component in the kit in FIGS. 14 and 15.
Figure 44:
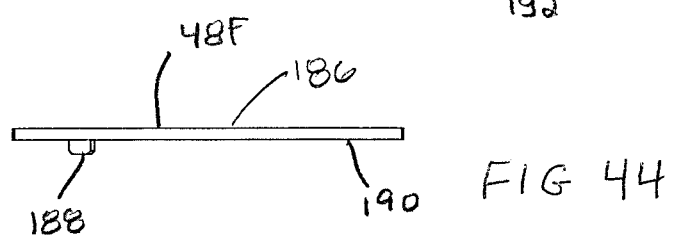
FIG. 44 is a plan view of the component in FIG. 43.
Figure 45:
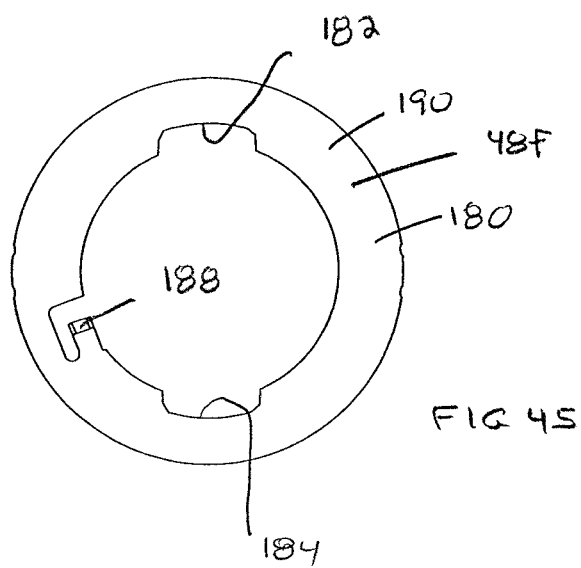
FIG. 45 is a front elevation view of the component in FIGS. 43 and 44.
Figure 47:
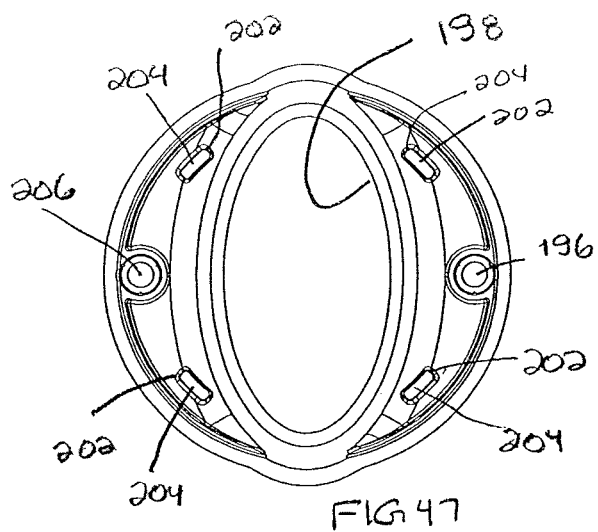
FIGS. 46-49 are different perspective views of a fifth component that is part of the kit in FIGS. 14 and 15.
Figure 46:
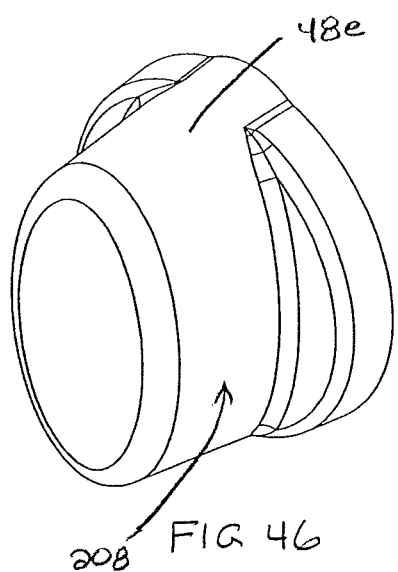
Figure 48:
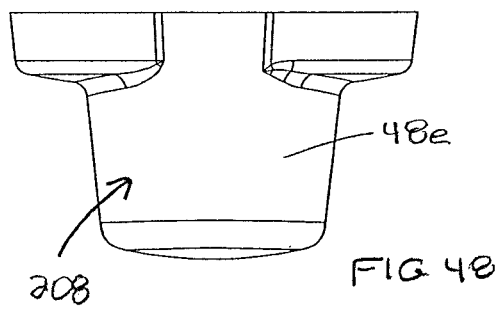
Figure 49:
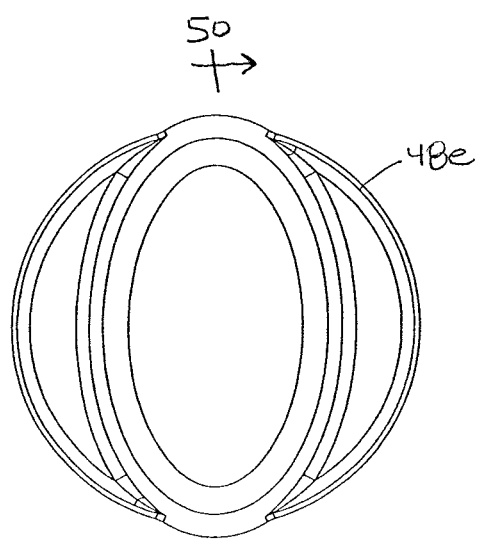
Figure 50:
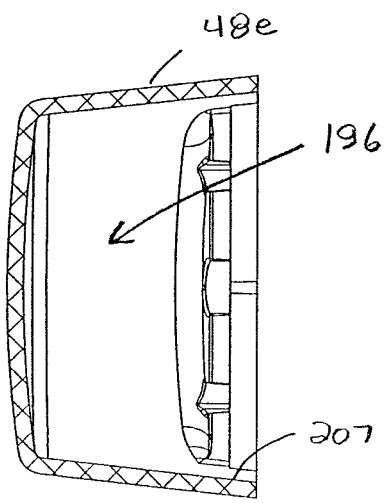
FIG. 50 is a cross-sectional view of the fifth component taken along line 50-50 of FIG. 49.

There are additional, optional, connectors on the components 48*c*, 48*d* that cooperate to facilitate consistent relative positioning of the interconnected components 48*c*, 48*d* and maintain angular alignment. As seen in FIG. 39, these connectors on the component 48*d* consist of diametrically opposite, elongate projections 158, 160 that are extended into complementary receptacles 162, 164, respectively, on the component 48*c*.

The projections 158, 160 and receptacles 162, 164 are connectors that are located on edges of flat, U-shaped walls 166, 168, respectively on the components 48*c*, 48*d*.

The kit 46 further includes a fifth component 48*e*, which is configured to facilitate operation of the operating handle 66 for the valve 18, as hereinafter described. In one exemplary form, the component 48*e* is interconnected to the components 48*c*, 48*d* through a sixth component 48*f*.

With the components 48*c*, 48*d* interconnected, the U-shaped wall portions 166, 168 cooperatively produce a continuous wall 170 (FIG. 29) extending around the conduit axis 80 and defining an axially facing surface 172.

The shapes of the portions 122, 124 extend slightly beyond the surface 172 so that a stepped diameter is produced that defines a radially outwardly facing annular surface 174 with an axial thickness t.

Retaining ears 176, 178 are provided respectively on the components 48*c*, 48*d* and are located at diametrically opposite locations. The retaining ears 176, 178 are fixed on their respective component to be spaced slightly from the surface 172 with the components 48*c*, 48*d* interconnected.

The sixth component 48*f* has a flat, ring-shaped body 180 with radially outwardly extending cutouts 182, 184 located to register one each with one of the retaining ears 176, 178. More particularly, one surface 186 on the body 180 can be placed facially against the surface 172 by aligning the tabs 176, 178 with the cutouts 182, 184 and pressing the body 180 towards the surface 172 to cause the blocking components to move through the cutouts 182, 184. By then turning the component 48*f* around the axis 80, the tabs 176, 178 and cutouts 182, 184 misalign whereby the component 48*f* becomes blocked from axial movement and thereby interconnected with the interconnected components 48*c*, 48*d*. Thus, the component 48*f* is maintained in operative relationship as shown in FIG. 66 and at the same time maintains the components 48*c*, 48*d* in their operative relationship by preventing separation thereof where the component body 180 surrounds the surface 174.

To facilitate turning of the body 180 on the component 48*f*, a tab 188 is formed on the body and projects angularly away from the plane of a flat surface 190 facing oppositely to the surface 186. In this case, the tab 188 is formed as one piece with the remainder of the body 180. The tab 188 is configured to be engaged by a user's finger(s) to angularly move the body 180 relative to the interconnected components 48*c*, 48*d* around the axis 80.

The tab 188 may also interact with one or more surfaces on the interconnected component 48*c* so that the tab 188 limits a range of turning to avoid inadvertent separation of the tab 188 once in its operative relationship.

With the components 48*a*, 48*b*, 48*c*, 48*d*, 48*f* in operative relationship, a nut 191 (FIG. 66), considered herein to be a portion of the valve body 22, projects through an opening 192 on the body 180. Beyond that portion of the body 22, a valve stem 194 is exposed, as is the operating handle 66, attached to the stem 194 to move as one piece therewith around the axis 80.

As seen particularly in FIGS. 46-50, the component 48*e* is a cup-shaped cap that defines a cavity 196 configured to allow the oval shape of the handle 66 to be pressed thereinto and keyed with a nominally matching oval surface 198 bounding a part of the cavity 196. Any other cooperating surface configurations that effect keying are contemplated. With the component 48*e* in its operative relationship with the valve handle 66 seated in the cavity 196, turning of the component 48*e* around the axis 80 causes the handle 66 to follow movement thereof.

While the surface 198 is depicted to nominally match the handle surface 200, as shown in FIG. 11, the surface 198 could likewise accommodate the handle 66', as shown in FIG. 12.

In either event, the component 48*e* is turned appropriately to change the state of the valve 18.

With the component 48*e* interconnected with the component 48*f*, in this case four projections 202 thereon have elongate, free end surfaces 204 that reside against or adjacent to the surface 190 on the body 180. The cooperation between the surfaces 204, 190 guides turning of the component 48*e* around the axis 80 as the valve state is changed.

The component 48*e* is maintained in its operative relationship through, in this case, a magnetic attraction between the components 48*e*, 48*f*. In the depicted form, the component 48*f* is made from a metallic material, such as, but not limited to, chrome plated or e-coated steel, with diametrically opposite magnets 206 affixed on the component 48*e* to reside against or in close proximity to the surface 190 with the components 48*e*, 48*f* interconnected and in operative relationship. One exemplary, but not limiting, form for each of the magnets 206 is an axially magnetized N42 nickel plated form with at least a 1.23 pound pull force. Other size magnets with more or less pull force can be used as can be appreciated.

The magnets 206 may be frictionally held by being press fit into place. Alternatively, or additionally, they may be glued in place or fixed through an over-molding process. Other attachment methods are contemplated.

The peripheral edge of the component 48*f* also performs a centering/guiding function as the component 48*e* is directed over the handle 66. That is, as this movement occurs, the edge on the component 48*f* acts against a tapered inside diameter region 207 at the entry to the cavity 196 to center the component 48*f* and interconnected components 48*c*, 48*d* in the cavity 196 as the component 48*e* is advanced over the valve handle 66 into operative relationship.

It should be understood that different arrangements to produce a magnetic attraction are contemplated. For example, the magnetized material may be on the component 48*f*, with one or more metal elements on the component 48*e*. One or more cooperating magnets may be used in lieu of the metal elements to generate the desired attraction force.

Further, the invention contemplates that the component 48*e* might be interconnected with the components 48*c*, 48*d* without the intermediate component 48*f*. That is, the magnetic attraction could be produced between the component 48*e* through interaction of one or more components thereon with one or more components directly on the surface 172 defined cooperatively by the interconnected components 48*c*, 48*d*.

An exposed, graspable region 208 has an oval shape as viewed along the axis 80 with the component 48*e* in operative relationship to facilitate convenient engagement by an operator's hand similarly as he/she would engage the handle 66. A larger and smoother grasping surface area facilitates positive and comfortable valve operation.

With the components 48*a*-48*f* interconnected and in operative relationship as shown in FIGS. 62-66, the components 48*a*-48*f* overlie substantially all exposed surfaces, or a substantial enough of the exposed surfaces of the fluid supply feature 10 that the overall appearance of the fluid supply feature 10 can be significantly changed.

In the depicted embodiments, only one region at 210 of the fluid supply feature 10 remains exposed. In that region 210, the delivery conduit 36 projects from the connector 32 on the valve 18.

It should be emphasized that while the designations "first", "second", third", etc. are used in association with the components throughout the detailed description and in the claims herein, this has been done simply for clarity in describing and claiming the components. These designations should not be viewed as being in any way limiting or requiring direct relationship between a descriptive and claim language. As an example, if the described "first" and "second" cooperating components are not used because either they are not desired or because there is no significant length, or effectively no projecting length, of the conduit 16 visible in a space, the "third" and "fourth" components between which the valve 18, 18' is located may be used without any "first" and "second" components.

There is no limit as to the material selection for the components 48*a*-48*f*. They may be made from the same material or different materials, as desired. Colors and material finishes can be selected to match fixtures and/or existing room motif. The ability to separate the components 48*a*-48*f* after they are placed in operative relationship, which is one contemplated form, allows for periodic changing of the appearance of the modified fluid supply feature 10.

While the exposed surfaces on the components 48*a*-48*f* are shown with one particular configuration, there is no limitation in this regard, as the components may have different shapes that are exposed to appeal to users. The depicted appearance of the component 48*e* may be changed significantly while maintaining the functional aspects thereof.

With the components 48*a*-48*f* interconnected and in operative relationship, the exposed surfaces are potentially more easily cleaned. At the same time, the components 48*a*-48*f* shield some or all of the existing fluid supply feature surfaces from potentially abrasive chemicals that promote rust and corrosion and may lead to a need to repair/replace some or all of the combined parts thereof.

While the components 48*a*-48*f* have been described to substantially fully surround the starting fluid supply feature parts, some or all of the components may leave exposed portions of those parts while still realizing benefits, as described above.

For example, while the components 48*a*, 48*b* are shown to cooperatively extend fully around the supply conduit 16, a single component may be used to cover only the upper region of the supply conduit 16 that is most visible and prone to being exposed to moisture and chemicals. Thus, the single piece may have an open, downwardly opening "U" shape across its axial extent.

Figure 51:
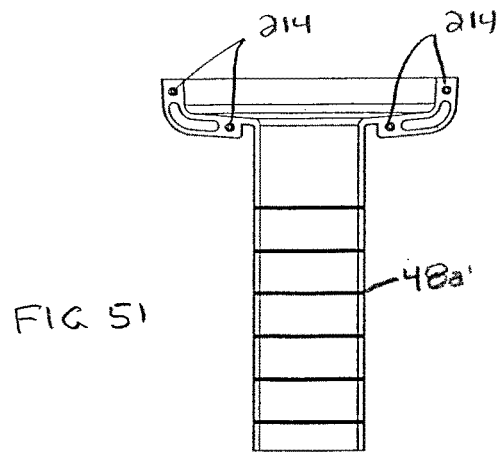
FIG. 51 is a view as in FIG. 22 and showing a modified form of that component.
Figure 52:
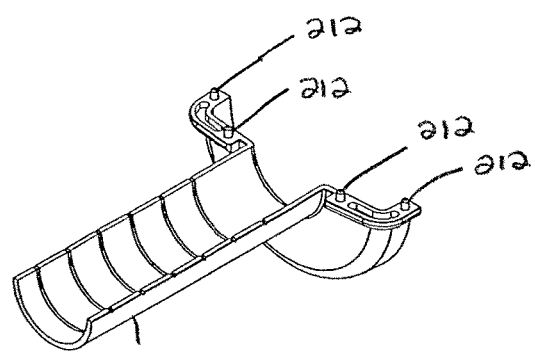
FIG. 52 is a perspective view of a modified form of the component shown in FIGS. 25-28.
Figure 53:
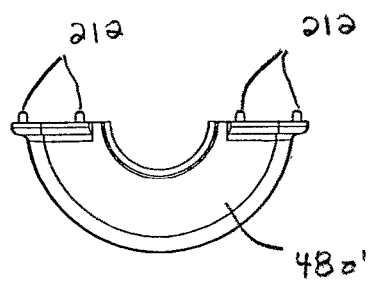
FIG. 53 is a front elevation view of the component in FIG. 52.

Many other modifications of the above-described designs are contemplated. For example, the manner of interconnecting the components to each other, and the fluid supply feature 10, which may herein be considered to include the fixture 20 and the surface 52, may vary significantly. As one example, as shown in FIGS. 51-53, modified forms of the components 48a, 48b are shown at 48b', 48a', to include connectors in the form of projecting pins 212 on the component 48b' which are directed into aligned openings 214 in the component 48a'. The pins 212 and openings 214 interact to facilitate consistent relative alignment of the components 48b', 48a' and may also maintain the interconnection of the components 48b', 48a'.

Figure 54:
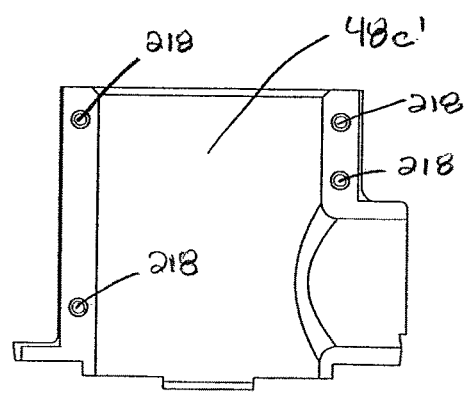
FIG. 54 is a view as in FIG. 37 and showing a modified form of that component.
Figure 55:
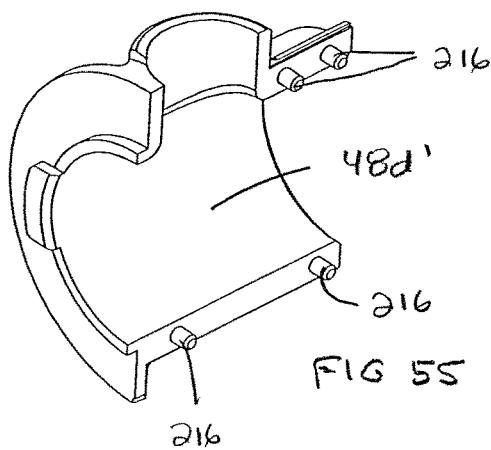
FIG. 55 is a view as in FIG. 39 and showing a modified form of that component.
Figure 56:
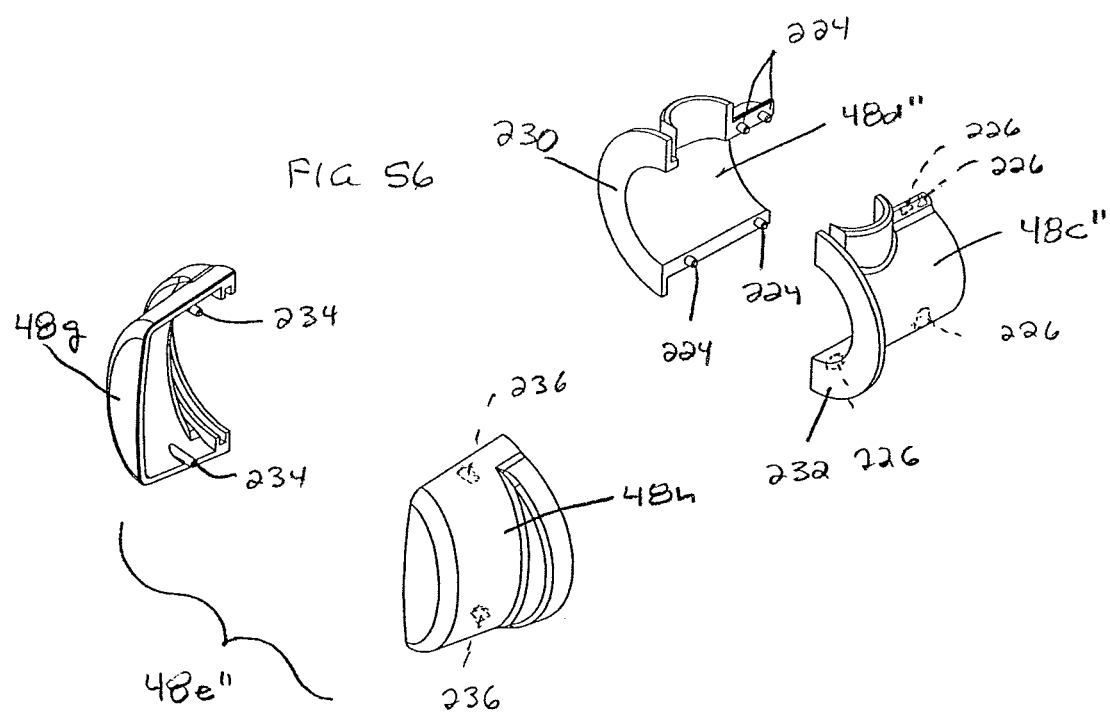
FIG. 56 is an exploded, perspective view of a modified form of the second, third, and fifth components, as depicted in earlier described FIGS.
Figure 57:
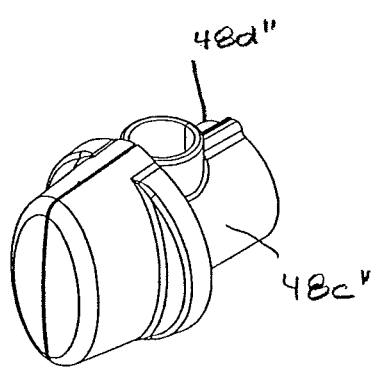
FIG. 57 is a view as in FIG. 56 with the components interconnected with each other.
Figure 58:
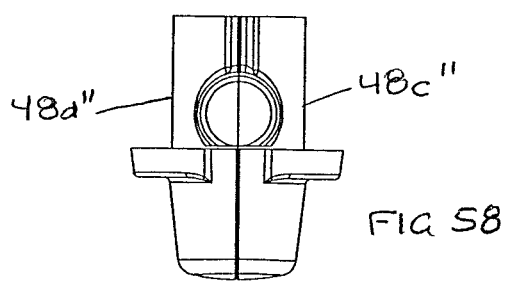
FIG. 58 is a plan view of the interconnected components in FIG. 57.
Figure 59:
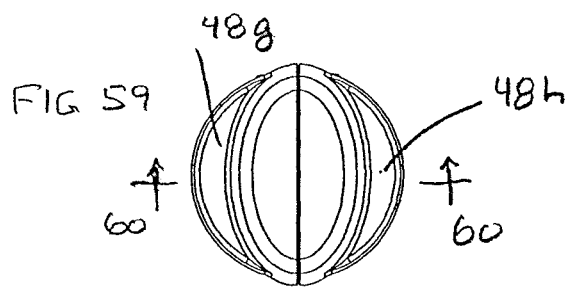
FIG. 59 is a front elevation view of the interconnected components in FIGS. 57 and 58.

As shown in FIGS. 54 and 55, a modified form of the components 48c, 48d at 48c', 48d' may include a similar arrangement of cooperating connectors made up of pins 216 and openings 218.

The pin and opening arrangement may be such that there is a loose connection which makes the connectors functional primarily as component alignment/locating structures. A tighter fit can loosely or positively maintain interconnection of the components 48b', 48a', and 48c', 48d'.

A further modified form of the components 48c, 48d, 48e is shown in FIGS. 56-61. Therein a component 48e" corresponding to the component 48e, is shown to be made up of joinable components 48g, 48h, which in this case are halves.

The component 48e" is configured to cooperate with components 48c", 48d" having the same general configuration as the components 48c, 48d and joined through connectors, in the depicted exemplary form being pins 224 and openings 226, that cooperate as described above.

The interconnected components 48c", 48d" produce a circular flat wall 228 made up of joined wall parts 230, 232.

The components 48g, 48h defining the component 48e" have exemplary cooperating connectors in the form of pins 234 and cooperating openings 236 which interact as the like cooperating connectors on the various components described above. These connectors, as with all component connectors, may be parts that are held together through press fitting, glue, clamping, latching, etc.

Figure 60:
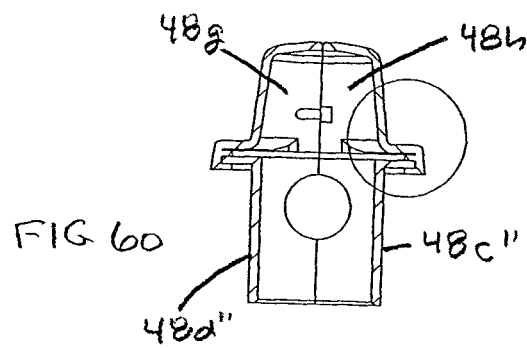
FIG. 60 is a cross-sectional view of the interconnected components taken along line 60-60 of FIG. 59.
Figure 61:
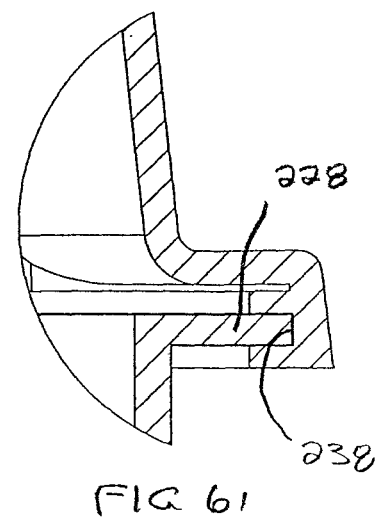
FIG. 61 is an enlarged view of the portions of the components within the circle in FIG. 60.
Figure 63:
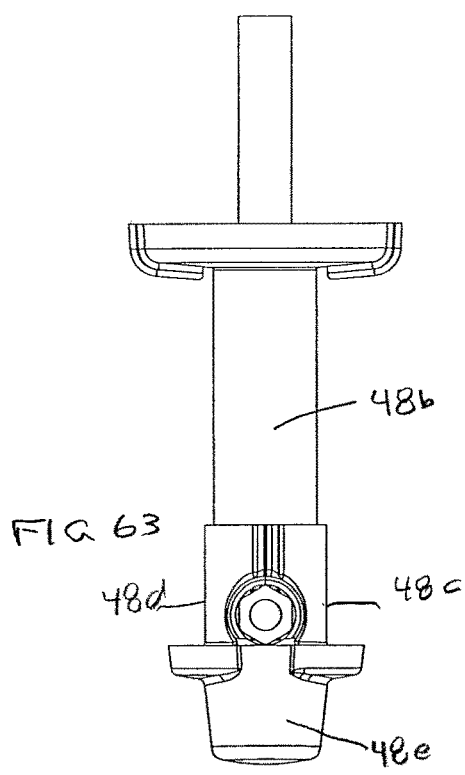
FIG. 63 is a view of the structure in FIG. 62 from a plan perspective.
Figure 64:
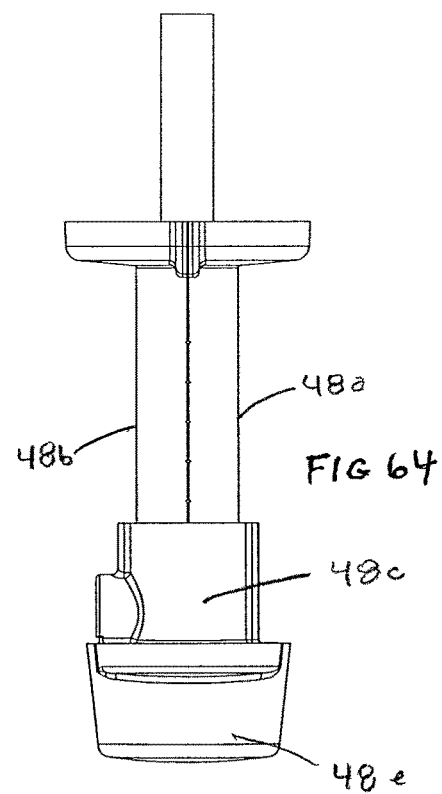
FIG. 64 is a view of the structure in FIG. 62 from a side elevation perspective.
Figure 65:
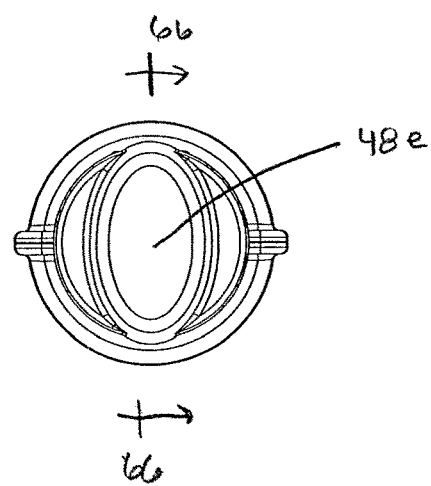
FIG. 65 is a view of the structure in FIG. 62 from a front elevation perspective.

The component 48e" is turned around the conduit axis 80 in the same manner as the component 48e to control the handle 66. The components 48g, 48h cooperatively produce a radially undercut, annular groove 238 which is complementary to the outer region of the wall 228 so that the outer edge of the wall 228 nests therein, as shown in FIGS. 60 and 61 with the components 48g, 48h interconnected and in operative relationship.

Accordingly, with the components 48g, 48h interconnected, the wall parts 230, 232 are captively maintained therebetween. The components 48g, 48h cooperatively produce a cavity for the handle 66 and are configured to engage the handle 66 in the same manner that the component 48e does while eliminating the need for the component 48f in the prior embodiment.

In yet a further alternative design, the interconnected components 48c, 48d may incorporate one or more bosses and/or one or more snap hooks or "cat's-paw hooks" (hereinafter "snap hooks") to project towards the component 48e. The component 48e could retain a plastic or metal washer and allow the inside diameter of the washer to engage with the snap hooks on the components 48c, 48d. Alternatively, the washer could be part of the interconnected components 48c, 48d, with the snap hooks on the component 48e. Further, the washer could be maintained inside the component 48e or on the interconnected components 48c, 48d using a press fit connection, adhesive, or other retention methods.

While the use of magnetic attraction to interconnect the component 48e allows the component 48e to be easily changed from its operative relationship, the component 48e" is also easily changed from its operative relationship by separating the press fit components 48g, 48h that make up the component 48e". This is made possible by relying upon frictional retention of the pins 234 in the openings 236.

In FIG. 68, another optional feature of the invention is depicted incorporated into the interconnected components 48a, 48b. Within the receptacle 110, one or more, and in this case two, intumescent pads 240, 242 are located. In the event of fire, the pads 240, 242 expand to block any gap that may exist between the supply conduit 16 and an edge bounding the surface opening 62. This potentially eliminates most, if not all, of the venting volume that may exist to avoid fueling of a fire in the volume 64 itself or in a contiguous volume.

In FIGS. 69-72, a modified form of component is shown at 48ab. The component 48ab essentially combines components, such as the aforementioned components 48a, 48b, into a single unit that defines a corresponding cup-shaped flange 78''' and a cylinder 76''' extending away from the flange 78'''.

The wall of the cylinder 76''' is interrupted to define a gap 244 extending from the axial end 246 up to the flange 78'''. The flange 78''' has a gap 248 of varied circumferential width extending fully through the flange 78''' below the cylinder 76'''.

The gaps 244, 248 allow the cylinder 76''' and flange 78''' to be deformed, whereby the cylinder 76''' diameter is effectively enlarged to be extended around the conduit 16, whereupon it assumes an undeformed state.

This construction avoids the need to form the cylinder 76''' and flange 78''' from multiple components.

The gaps 244, 248 can be configured so as to reside at the underside of the conduit 16 with the component 48ab in operative relationship.

Any additional components can be interconnected as described above.

In FIGS. 73-75, modified forms of the components 48c, 48d are shown at $48c^{4'}$, $48d^{4'}$.

In this embodiment, a wall $170^{4'}$, corresponding to the wall 170, and retaining ears $176^{4'}$, $178^{4'}$, corresponding to the retaining ears 176, 178, are formed as one piece with the component $48c^{4'}$.

The component $48c^{4'}$ has an upwardly opening U-shaped wall 250 upon which elongate ribs/rails/connectors 252, 254 are provided.

The ribs/rails/connectors 252, 254 cooperate respectively with elongate slots 256, 258 on the component $48d^{4'}$ to thereby allow the components $48c^{4'}$, $48d^{4'}$ to be slid guidingly against each other along the line indicated by the double-headed arrow 260.

With the components $48c^{4'}$, $48d^{4'}$ interconnected by being moved each towards the other along the line 260, the valve connector 32, typically in the form of a nut, resides within a receptacle at 264 bounded by a U-shaped wall 266 on the component $48d^4$ and the wall $170^{4'}$ against, or adjacent to which, the wall 266 becomes situated.

The same, or like components, as described above, can be interconnected at one or both axial ends of the interconnected components $48c^{4'}$, $48d^{4'}$.

In FIGS. 76-98, a further modified form of the inventive kit is shown at 46⁵'. The kit 46⁵' has an additional component 48i which can be used with any of the aforementioned kits. The component 48i consists of a cylindrical body 268 with a through opening 270 and an axial slit extending radially in one direction from the through opening 270. The body 268 is made from a deformable material, such as foam, whereby the split 272 allows the through opening 270 to be effectively enlarged so that the conduit 16 can be directed radially through the split 272 and into the through opening 270, whereupon the body 268 at least partially assumes its undeformed state.

The body 268 has an outer surface 274 with a diameter substantially larger than that of the conduit surface 74. The body 268 may extend either partially or fully around the conduit 16. The body 268 may be loosely fit or frictionally held and may be movably mounted, or adhered, to the conduit 16. If the conduit surface 74 is closely surrounded by the body 268, the body 268 is axially centered with respect to the conduit 16. The kit components engaged with the body 268 may be adhered thereto or releasably interconnected therewith. With the components in operative relationship, the body 268 may be in a relaxed state or radially compressed.

The components 48a⁵', 48b⁵' are sized and configured to accommodate the larger diameter of the outer surface 274. The connectors 48a⁵', 48b⁵' have substantially the same general configuration as the components 48a, 48b and in this embodiment are snap connected. To accomplish this, the component 48a⁵' has cantilevered connectors 276, 278 with holding edges 280, 282, respectively thereon. The connectors 276, 278 are configured so that camming surfaces 284, 286, respectively on the connectors 276, 278, progressively act against a concave surface 288 on the component 48b⁵' as the components 48a⁵', 48b⁵' are pre-aligned and urged against each other. This camming action causes the ends of the connectors 276, 278 to deflect inwardly until the edges 280, 282 move up to and beyond the circumferentially facing edges 290, 292 on the component 48b⁵'. As this occurs, the deformed connectors 276, 278 spring back towards an undeformed state under restoring forces therein to place the edges 280, 290 and 282, 292 in confronting relationship to maintain the interconnected relationship of the components 48a⁵, 48b⁵'.

With the kit 46⁵', components as in any prior embodiments can be used. As depicted, the component 48d⁵' corresponds generally to the component 48d⁴' described above and cooperates with a component 48j, which incorporates aspects of the component 48c⁴' and the component 48e.

The component 48d⁵' has slots 256⁵', 258⁵' that cooperate, one each, respectively, with ribs/rails/connectors 252⁵', 254⁵' on the component 48j. That is, the components 48d⁵', 48j are connected similarly to the way the components 48c⁴', 48d⁴' are connected.

Rather than having the vertically extending U-shaped wall 266, the component 48d⁵' has a cutout 294 through a wall 295 to accommodate the valve connector/nut 32.

In this embodiment, the component 48j covers the valve handle 66 without incorporating an ability to turn the same therethrough. Accordingly, when it is desired to operate the valve 18, the component 48j can be slid guidingly away from the component 48d⁵' to expose the handle 66 for normal operation thereof.

Figure 81:
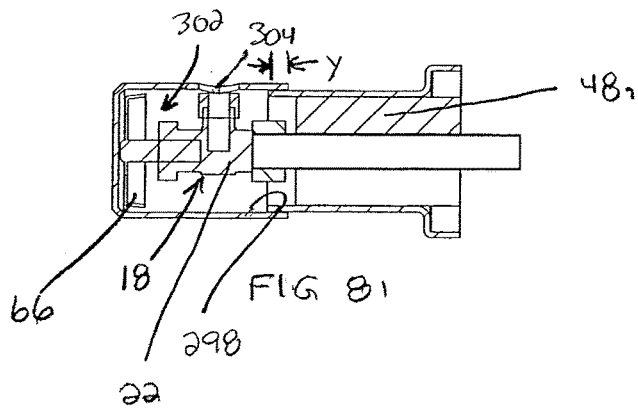
FIG. 81 is a front elevation view of the interconnected components taken along line 81-81 of FIG. 78.
Figure 82:
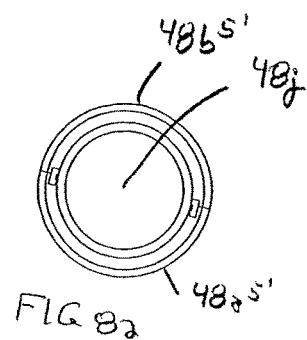
FIG. 82 is a cross-sectional view of the interconnected components in FIG. 79.
Figure 83:
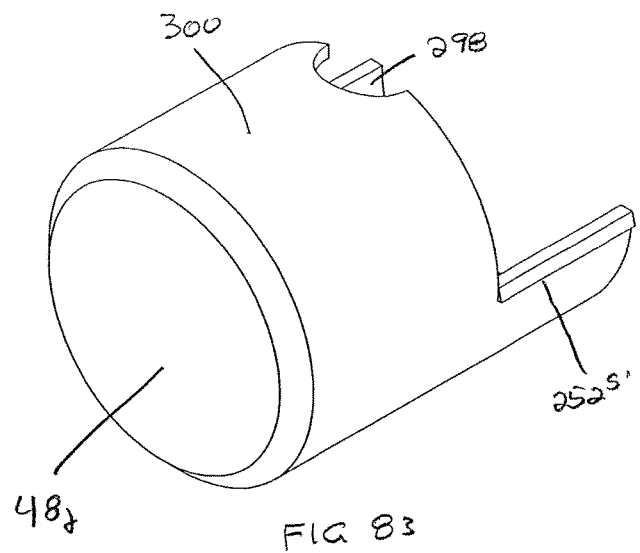
FIG. 83 is an enlarged, perspective view of one of the components on the kit in FIG. 76 and overlying the valve handle.
Figure 85:
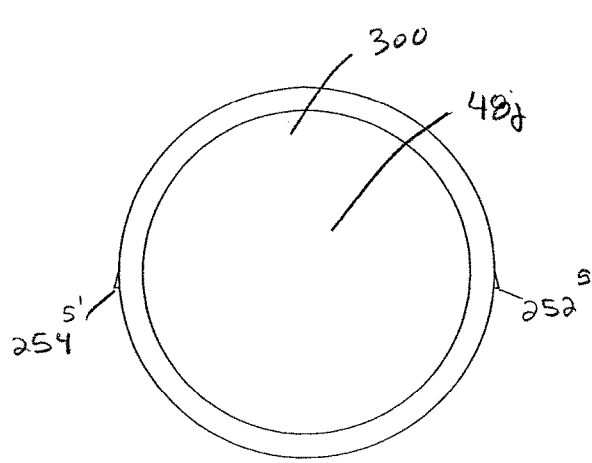
FIG. 85 is a front elevation view of the component in FIGS. 83 and 84.
Figure 84:
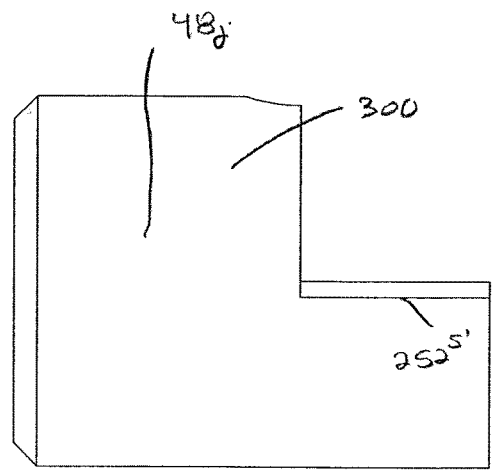
FIG. 84 is a side elevation view of the component in FIG. 83.
Figure 86:
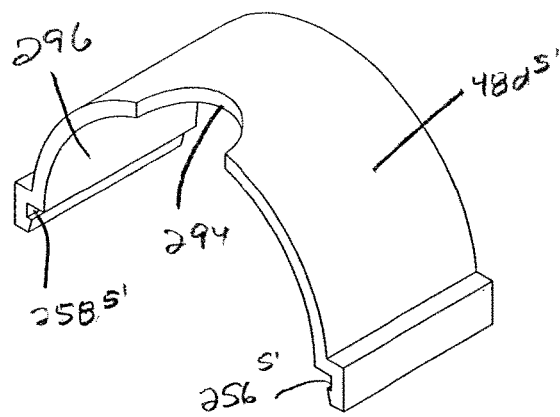
FIG. 86 is an enlarged, perspective view of one of the components on the kit in FIG. 76 to be interconnected with the component in FIGS. 83-85.
Figure 89:
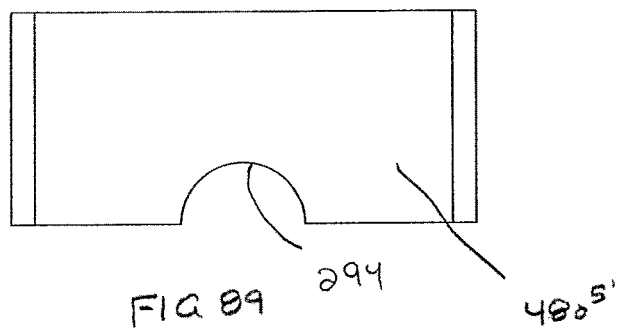
FIG. 89 is a plan view of the component in FIG. 86.
Figure 88:
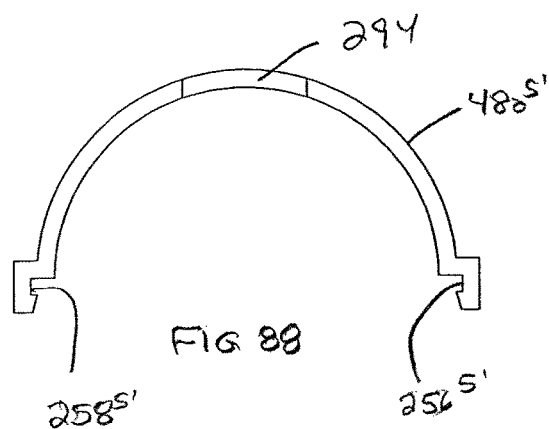
FIG. 88 is a front elevation view of the component in FIG. 86.
Figure 87:
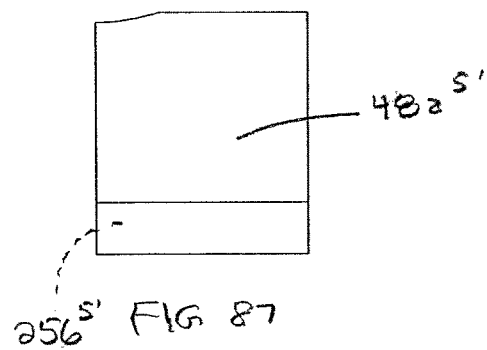
FIG. 87 is a fragmentary, side elevation view of the component in FIG. 86.
Figure 91:
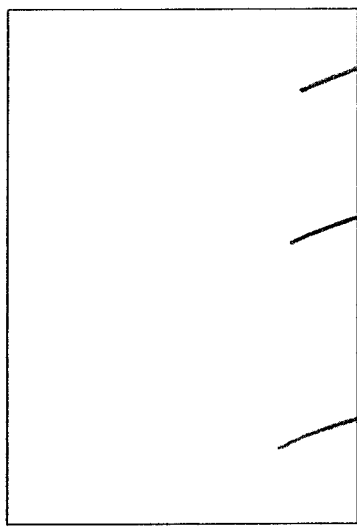
FIG. 91 is a plan view of the component in FIG. 90.
Figure 90:
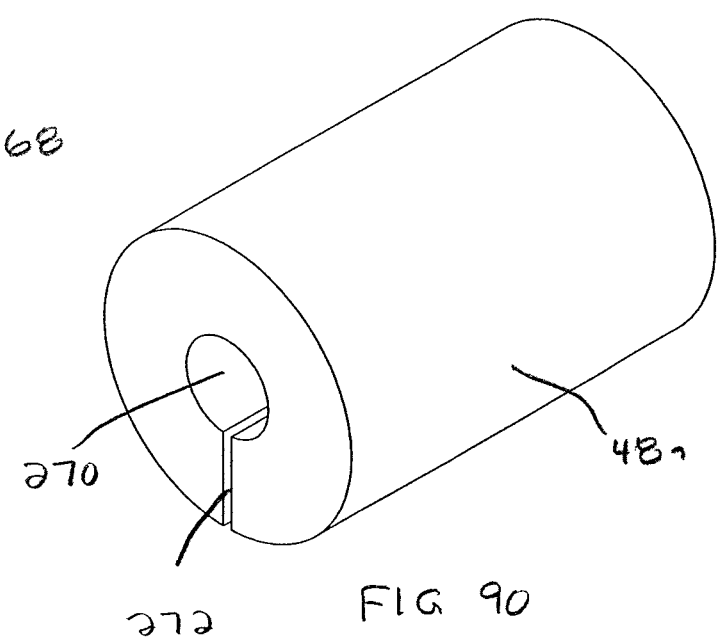
FIG. 90 is an enlarged, perspective view of one of the components on the kit in FIG. 76 and extending around the supply conduit on the fluid supply feature.
Figure 92:
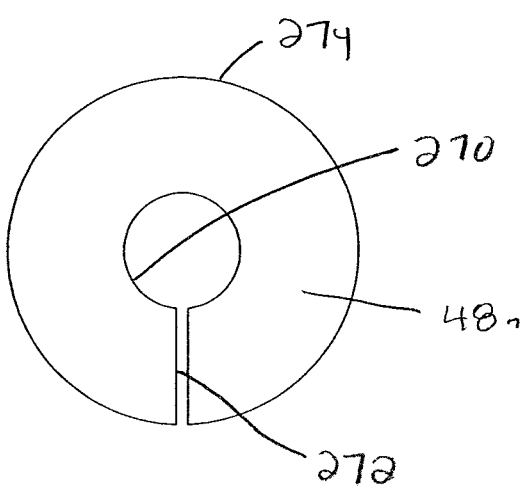
FIG. 92 is a front elevation view of the component in FIG. 90.
Figure 93:
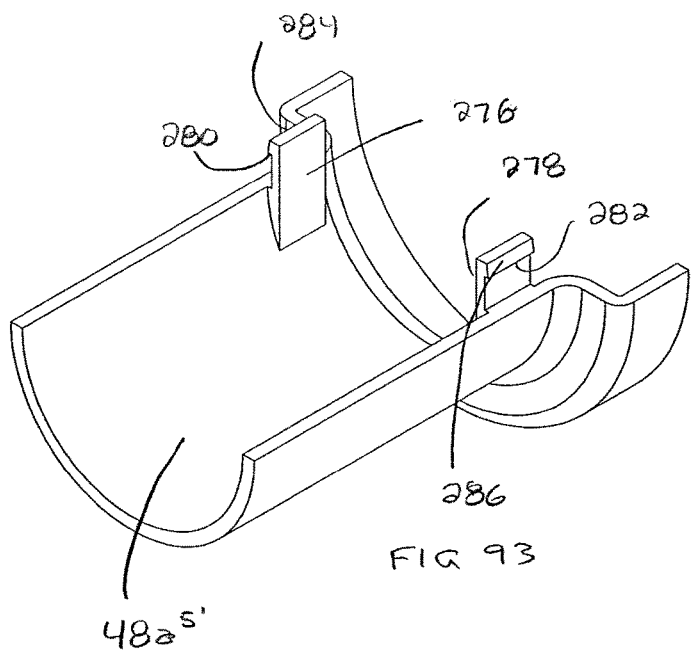
FIG. 93 is an enlarged, perspective view of one of the components on the kit in FIG. 76 which interconnects with and receives a portion of the component in FIGS. 90-92.
Figure 95:
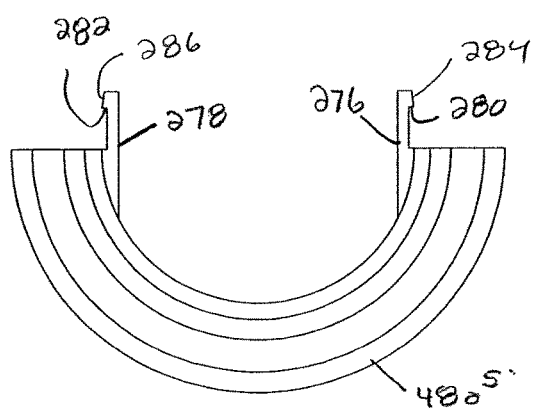
FIG. 95 is a front elevation view of the component in FIG. 93.
Figure 94:
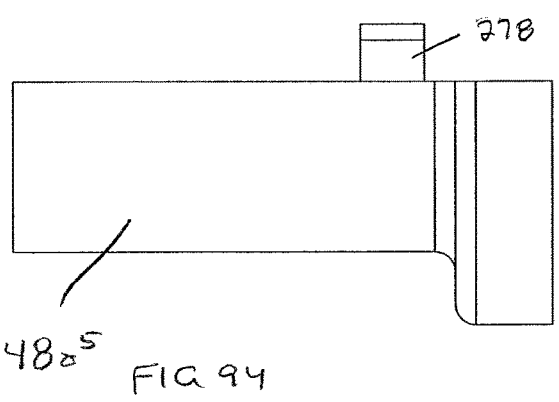
FIG. 94 is a side elevation view of the component in FIG. 93.
Figure 96:
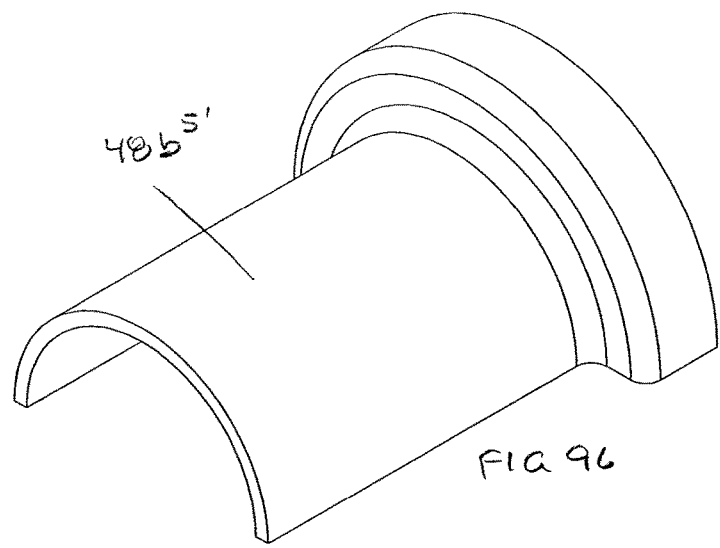
FIG. 96 is an enlarged, perspective view of the component on the kit in FIG. 76 which interconnects with the component in FIGS. 93-95 and receives and interconnects with part of the component in FIGS. 90-92.
Figure 99:
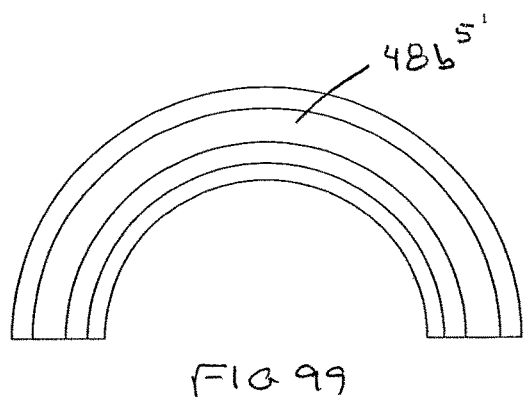
FIG. 99 is a front elevation view of the component in FIG. 96.
Figure 97:
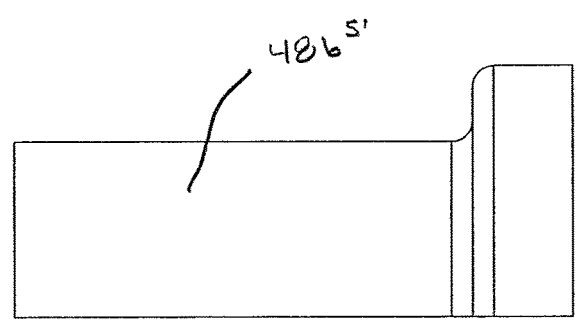
FIG. 97 is a side elevation view of the component in FIG. 96.
Figure 98:
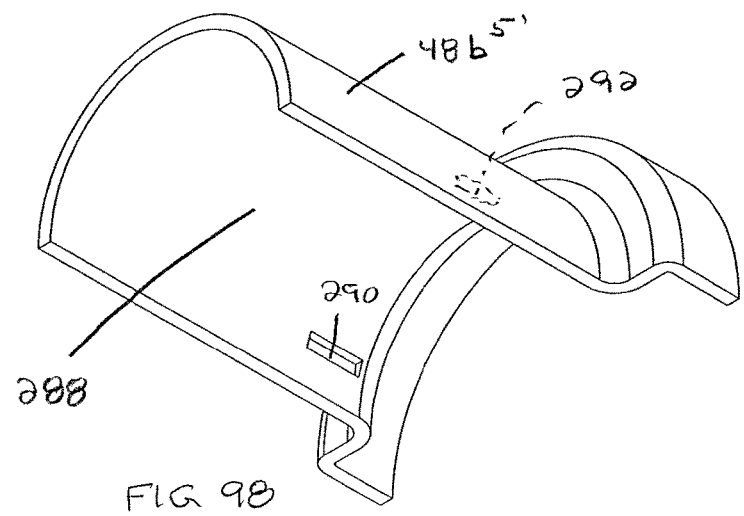
FIG. 98 is a perspective view of the component in FIG. 96 taken from a different angle.

As can be seen, the components 48d⁵', 48j, respectively have oppositely opening, U-shaped surfaces 296, 298, that cooperatively surround the interconnected components 48a⁵', 48b⁵', in this case a distance y, as shown in FIG. 81.

The body 300 on the component 48j defines a cup-shaped receptacle 302 to receive a majority of the valve body 22. The body 300 has a cutout 304 that registers with the cutout 294 to accommodate the valve connector/nut 32.

The invention allows use of the kit 46 to modify a fluid supply feature at time of initial installation. Alternatively, the kit 46 can be retrofit to afford the aforementioned advantages—notably improving appearance, facilitating cleaning, aesthetically matching other features in a particular room, etc. The ability to offer multiple versions of the kit in terms of how the components connect, are shaped, are constructed, appear, etc. affords versatility that can adapt to differently configured fluid supply features and offer unlimited appearances available in a wide range of different prices depending upon the material used, the particular design selected, etc. While a relatively simple construction of the kit components may significantly improve appearance, higher end versions permit matching of high end designs, including faucets, fixtures, etc.

The interconnection of the components can be maintained in many different ways, either permanently or temporarily. The components may be interconnected with each other and/or the fluid supply feature, potentially including a fixture or wall surface, using one or a combination of adhesives, snap connections, clamped connections, press fitting connections, etc. Different types of connections may be used between components in association with the same fluid supply feature. For example, certain of the components may be snap fit together while others use press fit connections such as openings in which pins are press fit. All of the connection types described herein, and others, may be used interchangeably.

While all specific valves shown in detail are angled valves, the same concepts are used with straight valves, such as those encompassed within the generic showing in FIG. 1, that commonly come through a floor. For example, the same handle cover components and other components (magnets, component corresponding to the component 48f, components overlying the conduit 16, etc.) may be used while using the same type of connection with the valve covering components fitting close to a valve nut and having retaining ears projecting outward towards a corresponding handle. Likewise, with a straight valve the details of the components described are exemplary but not limiting in nature.

As depicted, interconnection can be effected without requiring separate fasteners. This facilitates initial interconnection and potentially later separation of the components from each other, fixtures, and/or wall surfaces. Of course, use of separate fasteners to maintain, or stabilize, connections, is contemplated.

A number of the above-described configurations for the kit components allow the kit components to be placed in operative relationship and separated therefrom without having to shut off a water supply to the fluid supply feature 10.

Figure 32:
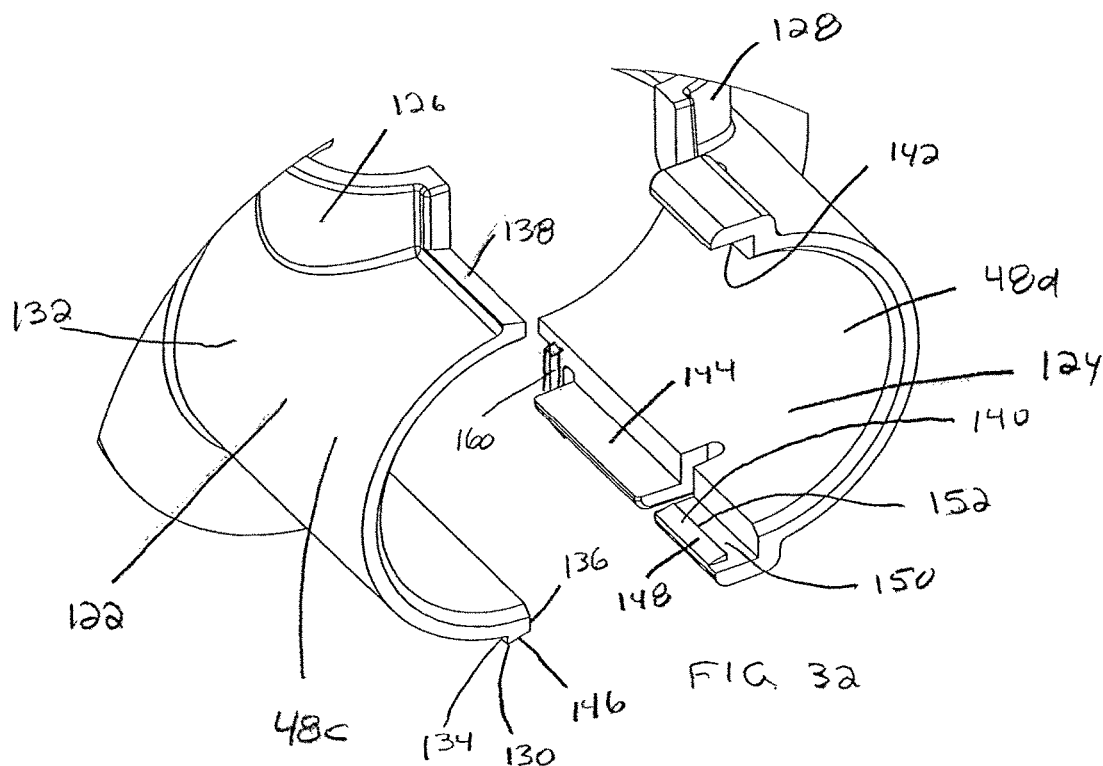
FIG. 32 is an enlarged view of connectors on the components as shown in FIG. 31.
Figure 33:
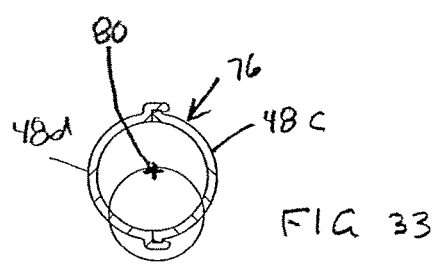
FIG. 33 is a cross-sectional view of connectors cooperating between the components in FIGS. 29-32 and taken along line 33-33 of FIG. 30.
Figure 34:
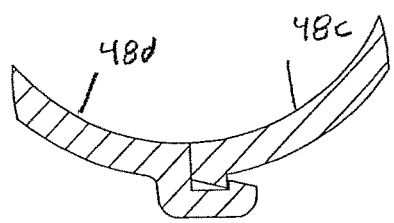
FIG. 34 is an enlarged view of the connectors within the circle in FIG. 33.
Figure 35:
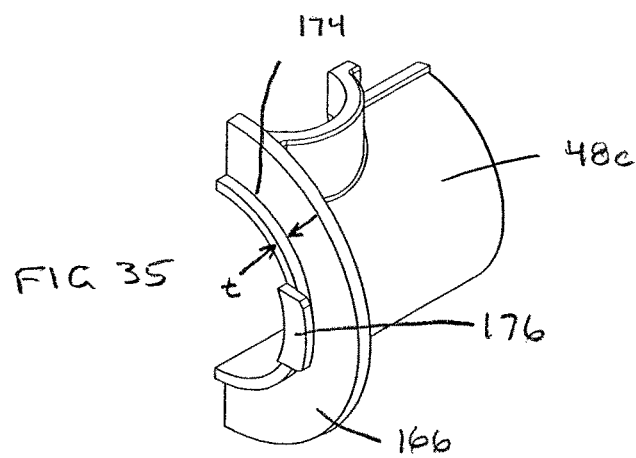
FIGS. 35-38 are different enlarged, perspective views of the third component shown in FIGS. 29-34.
Figure 37:
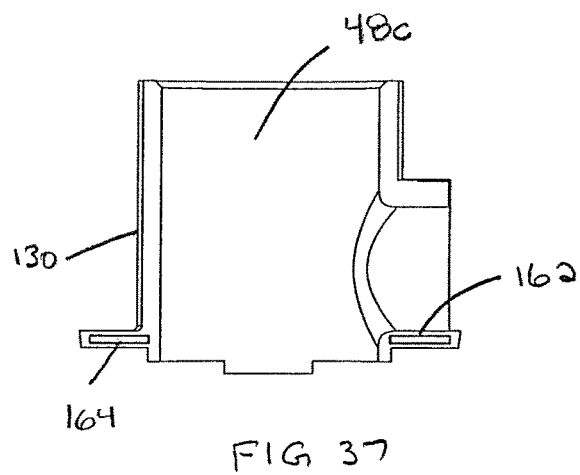
Figure 36:
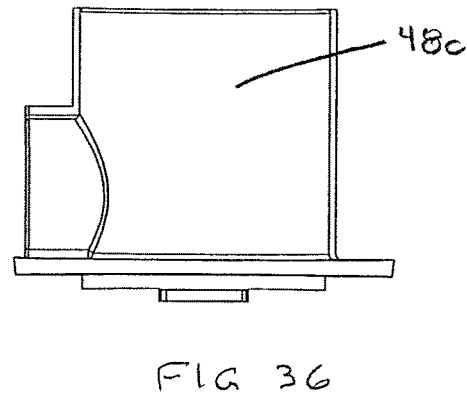
Figure 38:
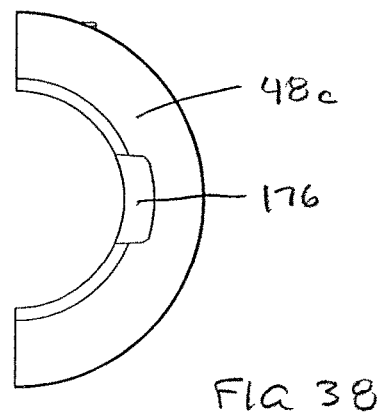

Engaging regions between connectors on the components may be strategically placed to afford additional advantages. For example, the connectors on the components 48c, 48d, as shown in FIGS. 31 and 32, are present outside the volume created to receive the valve body 22. This avoids interference with the valve body and may limit the overall size of the combined components. This outside arrangement of the connectors also increases the overall potential axial overlap region between the components 48c, 48d and 48a, 48b.

This configuration may facilitate shipping the product in a more compressed form with smaller packaging.

As noted previously, the connection locations are not limited. In certain applications, changing of the connection location, as between top and sides, may afford advantages.

Still further, the specific component forms contemplated are not limited to those shown. As but one example, a single component may overlie part or all of the valve 18 and part or all of the conduit 16. As another example, without limitation, a component may overlie the valve 18 and project towards a surface from which the conduit 16 projects. The projecting length might be pre-measured or changed on site, as to potentially be covered by a multi-part escutcheon. Combining other aspects of components described above, and others, is contemplated with the specific forms being exemplary in nature only to set forth the basic inventive concepts.

All components can be construction of metal, plastic, or other material. Metal materials can be aluminum, nickel alloys, titanium, copper, steel and stainless steel or other metals that can be formed and chrome plated or vacuum plated. The plastic material can be, without limitation, ABS, materials like Novodur P2MC, P2K, Polylac, Cycolac, Toyolac, HI 121, ABS-PC materials like Bayblend T45, T65, and T85, Cycoloy, Xantar CCM 206, Phenolic, Urea formaldehyde, Polyethersulfone, Polyacetal, Diallyl phthalate, Polyethermimide, Teflon, Polyarylether, Polycarbonate, Polyphenylene oxide (modified), Mineral-reinforced nylon (MRN), Polysulfone, Polystyrene, PPA plastics like Xylex, Urethane, Polypropylene, Nylon and Noryl, as well as Polyetherimide and PEEK or other plastic materials that can be chrome plated or vacuum plated. Plastic parts may have different finishes such as chrome, white, grey, brushed nickel, or other colors or finishes.

Figure 100:
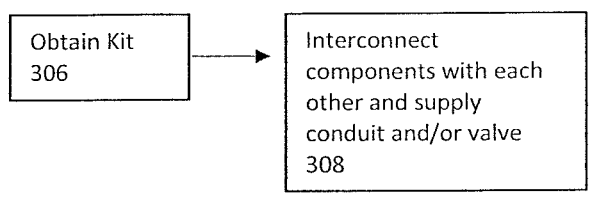
FIGS. 100 and 101 are flow diagram representations of a method of modifying a fluid supply feature, according to the invention.

In FIG. 100 one form of the inventive method for modifying a fluid supply feature, including a conduit communicating fluid from a source to a valve through which fluid is delivered to a point of use, is shown in flow diagram form.

As shown at block 306, a kit is obtained made up of a plurality of components from two in number to any larger number.

As shown at block 308, the plurality of components are interconnected with each other and at least one of the supply conduit and valve to thereby maintain the plurality of components in an operative relationship, wherein the plurality of components overlie an exposed surface on at least one of the valve and conduit.

Figure 101:
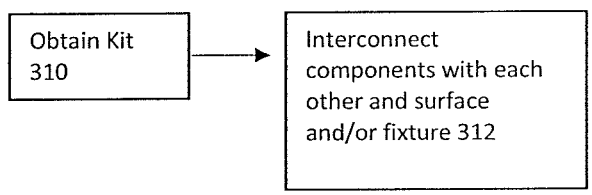

In FIG. 101, a modified form of the inventive method is shown in flow diagram form. As shown at block 310, a kit is obtained, as in block 306.

As shown at block 312, the plurality of components are interconnected with each other and at least one of the surface on the wall through which the supply conduit projects and a fixture, such as a toilet, to thereby maintain the plurality of components in an operative relationship wherein the plurality of components overlie an exposed surface on at least one of the valve and conduit.

The components 48 are shown interconnected and in operative relationship on the fluid supply feature 10 in FIGS. 62-66, 77, and 78.

The same kit is shown adapted to the fluid supply feature 10' in FIG. 67.

It should be understood that references to top, bottom, side, etc., are arbitrary and that the component interconnection is not limited in terms of orientation thereof. The directional references are strictly for purposes of simplifying the description herein.

The foregoing disclosure of specific embodiments is intended to be illustrative of the broad concepts comprehended by the invention.

The invention claimed is:

1. A method of modifying a fluid supply feature comprising a conduit communicating fluid from a source to a valve through which fluid is delivered to a point of use within a space bounded in part by a surface of a wall, the conduit having a length portion projecting from an opening through the wall surface and into the space, the method comprising the steps of:

obtaining a kit comprising a plurality of components; and interconnecting the plurality of components with each other and at least one of the conduit and valve to thereby maintain the plurality of components in an operative relationship wherein the plurality of components overlie an exposed surface on at least one of the valve and conduit, wherein the plurality of components comprises first and second discrete components that are movable relative to each other and the step of interconnecting the plurality of components comprises connecting the first and second components to each other so that at least parts of the first and second components cooperatively extend at least partially around at least a portion part of the length portion of the conduit with the plurality of components in the operative relationship, wherein the plurality of components comprises third and fourth discrete components that are movable relative to each other, the third and fourth components initially separate from the first and second components, wherein the step of interconnecting the plurality of components comprises placing at least a part of the valve and at least part of at least one of the first and second discrete components between at least parts of the third and fourth components with the plurality of components in the operative relationship.

2. The method of modifying a fluid supply feature according to claim 1 wherein the point of use is one of: a) a reservoir on a toilet tank; and b) a sink/basin.

3. The method of modifying a fluid supply feature according to claim 1 wherein the plurality of components are configured to be maintained in the operative relationship without requiring use of separate fasteners.

4. The method of modifying a fluid supply feature according to claim 1 wherein the valve has an operating handle, the plurality of components comprises a fifth discrete component defining a receptacle, and the step of interconnecting the plurality of components comprises directing at least a part of the operating handle into the receptacle on the fifth component with the plurality of components in the operative relationship.

5. The method of modifying a fluid supply feature according to claim 4 wherein the step of interconnecting the plurality of components comprises connecting the fifth component to at least one of the third and fourth components with the plurality of components in the operative relationship.

6. The method of modifying a fluid supply feature according to claim 5 wherein the plurality of components comprises joinable separate components making up the fifth component and the step of interconnecting the plurality of components comprises joining the joinable components making up the fifth component together with a portion of at least one of the third and fourth components between the joinable components making up the fifth component with the plurality of components in the operative relationship.

7. The method of modifying a fluid supply feature according to claim 4 wherein the operating handle is turned around an axis to thereby change a state of the valve and with the at least part of the handle directed into the receptacle on the fifth component the handle and fifth component are in a keyed relationship such that turning of the fifth component around the handle axis causes the handle to be turned around the handle axis.

8. The method of modifying a fluid supply feature according to claim 1 wherein there are cooperating connectors on at least one of: a) the first and second components; and b) the third and fourth components that consistently align the at least one of: a) the first and second components; and b) the third and fourth components with the plurality of components in the operative relationship.

9. The method of modifying a fluid supply feature according to claim 8 wherein the cooperating connectors on the at least one of: a) the first and second components; and b) the third and fourth components are configured to allow the at least one of: a) the first and second components; and b) the third and fourth components to be snap fit together with the plurality of components in the operative relationship.

10. The method of modifying a fluid supply feature according to claim 1 and further comprising the step of removing a portion of at least one of the first and second components to thereby change a degree of coextension of the at least one of the first and second components over the length portion of the conduit with the plurality of components in the operative relationship.

11. The method of modifying a fluid supply feature according to claim 1 wherein the valve has an outlet connector and with the plurality of components in the operative relationship the third and fourth components cooperatively define a receptacle for at least a part of the valve outlet connector.

12. The method of modifying a fluid supply feature according to claim 1 wherein the valve has at least one shoulder facing in a lengthwise direction with respect to the conduit, and at least one of the third and fourth components has a shoulder that is in confronting relationship with the at least one shoulder to limit relative movement between the valve and the at least one of the third and fourth components along the length of the conduit.

13. In combination:
a fluid supply feature comprising a conduit communicating fluid from a source to a valve through which fluid is delivered to a point of use; and
a plurality of components interconnected with each other and at least one of the conduit and valve as in claim 1 to thereby be maintained in operative relationship wherein the plurality of components overlie an exposed surface on at least one of the valve and conduit.

14. A method of modifying a fluid supply feature comprising a conduit having a length and communicating fluid from a source to a valve through which fluid is delivered to a point of use, the method comprising the steps of:
obtaining a kit comprising a plurality of components; and
interconnecting the plurality of components with each other and at least one of the conduit and valve to thereby maintain the plurality of components in an operative relationship wherein the plurality of components overlie an exposed surface on at least one of the valve and conduit,
wherein the plurality of components comprises first and second discrete components that are movable relative to each other and the step of interconnecting the plurality of components comprises connecting the first and second components to each other so that at least parts of the first and second components cooperatively extend at least partially around at least a portion of the length of the conduit with the plurality of components in the operative relationship,
wherein the plurality of components comprises third and fourth discrete components that are movable relative to each other, the third and fourth components initially separate from the first and second components,
wherein the step of interconnecting the plurality of components comprises placing at least a part of the valve and at least part of at least one of the first and second discrete components between at least parts of the third and fourth components with the plurality of components in the operative relationship,
wherein the valve has an operating handle,
wherein the plurality of components comprises a fifth component defining a receptacle, and the step of interconnecting the plurality of components comprises directing at least a part of the operating handle into the receptacle on the fifth component with the plurality of components in the operative relationship,
wherein the step of interconnecting the plurality of components comprises connecting the fifth component to at least one of the third and fourth components with the plurality of components in the operative relationship,
wherein the step of connecting the fifth component to the at least one of the third and fourth component comprises: a) connecting a sixth discrete component to the at least one of the third and fourth components; and b) connecting the fifth component to the sixth component with the plurality of components in the operative relationship.

15. The method of modifying a fluid supply feature according to claim 14 wherein the step of connecting the sixth component to the at least one of the third and fourth components comprises connecting the sixth component to each of the third and fourth components so as to thereby maintain the third and fourth components against separation from each other with the plurality of components in the operative relationship.

16. The method of modifying a fluid supply feature according to claim 14 wherein the step of connecting the fifth component to the sixth component comprises causing the fifth and sixth components to be magnetically attracted to each other with the plurality of components in the operative relationship.

17. The method of modifying a fluid supply feature according to claim 14 wherein the point of use is one of: a) a reservoir on a toilet tank; and b) a sink/basin.

18. A method of modifying a fluid supply feature comprising a conduit communicating fluid from a source to a valve through which fluid is delivered to a point of use, the valve having an operating handle, the method comprising the steps of:
obtaining a kit comprising a plurality of components; and
interconnecting the plurality of components with each other and at least one of the conduit and valve to thereby maintain the plurality of components in an operative relationship wherein the plurality of components overlie an exposed surface on at least one of the valve and conduit,
the plurality of components comprising one discrete component and another discrete component connected to each other with the plurality of components in the operative relationship, at least a part of the valve residing between the one discrete component and the another discrete component, the plurality of components in the operative relationship comprising a further component connected to the one discrete component and the another discrete component with the one discrete component and the another discrete component connected to each other and defining a receptacle for the operating handle, wherein the operating handle is turned around an axis to thereby change a state of the valve and with the plurality of components in the operative relationship at least part of the handle is directed into the receptacle on the further component so that the handle and further component are in a keyed relationship such that turning of the further component around the handle axis causes the handle to be turned around the handle axis.

19. The method of modifying a fluid supply feature according to claim 18 wherein there are cooperating connectors on the one discrete component and the another discrete component that cooperate and consistently align the one discrete component and the another discrete component with the plurality of components in the operative relationship.

20. The method of modifying a fluid supply feature according to claim 18 wherein the plurality of components comprises an additional component through which the further component is connected to the one discrete component and the another discrete component with the one discrete component and the another discrete component connected to each other and with the plurality of components in the operative relationship.

21. The method of modifying a fluid supply feature according to claim 20 wherein the additional component is connected to each of the one discrete component and the another discrete component so as to thereby maintain the one discrete component and the another discrete component against separation.

22. The method of modifying a fluid supply feature according to claim 21 wherein the further component and the additional component are magnetically attracted to each other with the plurality of components in the operative relationship.

23. The method of modifying a fluid supply feature according to claim 18 wherein the conduit has a length and the plurality of components comprises at least a first component that extends at least partially around at least a portion of the length of the conduit with the plurality of components in the operative relationship.

24. The method of modifying a fluid supply feature according to claim 23 wherein the at least first component comprises first and second separate components that are connected to each other with the plurality of components in the operative relationship.

25. The method of modifying a fluid supply feature according to claim 23 wherein the one discrete component and the another discrete component extend at least partially around the at least first component with the plurality of components in the operative relationship.

26. The method of modifying a fluid supply feature according to claim 18 wherein the point of use is one of: a) a reservoir on a toilet tank; and b) a sink/basin.

27. The method of modifying a fluid supply feature according to claim 18 wherein the plurality of components are configured to be maintained in the operative relationship without requiring use of separate fasteners.

28. A method of modifying a fluid supply feature comprising a conduit communicating fluid from a source to a valve through which fluid is delivered to a point of use within a space, the space bounded in part by a surface of a wall, the conduit having a length portion projecting from an opening through the wall surface and into the space, the method comprising the steps of: obtaining a kit comprising a plurality of components; and interconnecting the plurality of components with each other and at least one of the conduit and valve to thereby maintain the plurality of components in an operative relationship wherein the plurality of components overlie an exposed surface on at least one of the valve and conduit, wherein the plurality of components comprises first and second discrete components that are movable relative to each other and the step of interconnecting the plurality of components comprises connecting the first and second components to each other so that at least parts of the first and second components cooperatively extend around the length portion of the conduit with the plurality of components in the operative relationship, wherein the parts of the first and second components cooperatively extend fully around at least a part of the length portion of the conduit and have a first effective outer diameter, wherein a separate part of at least one of the first and second components defines a flange: a) extending at least partially around the length portion of the conduit; b) having a second effective diameter greater than the first effective diameter; and c) overlying the wall surface with the plurality of components in the operative relationship, wherein there is an escutcheon plate overlying the wall surface and having an opening through which the length portion of the conduit extends and the flange defines a receptacle for a part of the escutcheon plate.

29. The method of modifying a fluid supply feature according to claim 28 further comprising the step of adhering the flange to the wall surface.

30. The method of modifying a fluid supply feature according to claim 28 wherein the point of use is one of: a) a reservoir on a toilet tank, and b) a sink/basin.

* * * * *

UNITED STATES PATENT AND TRADEMARK OFFICE
CERTIFICATE OF CORRECTION

PATENT NO. : 12,338,609 B2
APPLICATION NO. : 17/580024
DATED : June 24, 2025
INVENTOR(S) : Michael J. Schuster Page 1 of 1

It is certified that error appears in the above-identified patent and that said Letters Patent is hereby corrected as shown below:

In the Claims

Column 22, Lines 5-37, should read:
1. A method of modifying a fluid supply feature comprising a conduit communicating fluid from a source to a valve through which fluid is delivered to a point of use within a space bounded in part by a surface of a wall, the conduit having a length portion projecting from an opening through the wall surface and into the space, the method comprising the steps of:
    obtaining a kit comprising a plurality of components; and
    interconnecting the plurality of components with each other and at least one of the conduit and valve to thereby maintain the plurality of components in an operative relationship wherein the plurality of components overlie an exposed surface on at least one of the valve and conduit,
    wherein the plurality of components comprises first and second discrete components that are movable relative to each other and the step of interconnecting the plurality of components comprises connecting the first and second components to each other so that at least parts of the first and second components cooperatively extend at least partially around at least a part of the length portion of the conduit with the plurality of components in the operative relationship,
    wherein the plurality of components comprises third and fourth discrete components that are movable relative to each other, the third and fourth components initially separate from the first and second components,
    wherein the step of interconnecting the plurality of components comprises placing at least a part of the valve and at least part of at least one of the first and second discrete components between at least parts of the third and fourth components with the plurality of components in the operative relationship.

Signed and Sealed this
Thirtieth Day of September, 2025

John A. Squires
*Director of the United States Patent and Trademark Office*